US007717447B2

(12) United States Patent
Orford

(10) Patent No.: US 7,717,447 B2
(45) Date of Patent: May 18, 2010

(54) PROPULSION AID

(75) Inventor: Robert Nicholas Charles Orford, Watford (GB)

(73) Assignee: Pure Global Limited, Watford (GB)

( * ) Notice: Subject to any disclaimer, the term of this patent is extended or adjusted under 35 U.S.C. 154(b) by 807 days.

(21) Appl. No.: 10/571,341

(22) PCT Filed: Sep. 9, 2004

(86) PCT No.: PCT/GB2004/003848

§ 371 (c)(1),
(2), (4) Date: Jun. 12, 2006

(87) PCT Pub. No.: WO2005/025973

PCT Pub. Date: Mar. 24, 2005

(65) Prior Publication Data

US 2007/0024020 A1 Feb. 1, 2007

(30) Foreign Application Priority Data

Sep. 12, 2003 (GB) ................................ 0321474.9
Mar. 18, 2004 (GB) ................................ 0406148.7

(51) Int. Cl.
*B62M 1/14* (2006.01)

(52) U.S. Cl. .................. 280/250.1; 280/210; 280/242.1

(58) Field of Classification Search ................. 280/210, 280/242.1, 250.1
See application file for complete search history.

(56) References Cited

U.S. PATENT DOCUMENTS 3,869,146 A * 3/1975 Bulmer .................... 280/250.1
3,877,725 A * 4/1975 Barroza ................... 280/250.1
4,354,691 A * 10/1982 Saunders et al. ......... 280/250.1
4,762,332 A * 8/1988 Seol ........................ 280/250.1
5,232,236 A * 8/1993 Korpi ...................... 280/250.1
5,303,945 A * 4/1994 Oxford .................... 280/304.1
5,988,661 A * 11/1999 Garfinkle ................. 280/250.1
6,715,780 B2 * 4/2004 Schaeffer et al. ............ 280/248

FOREIGN PATENT DOCUMENTS

GB 2 213 438 A 8/1989
GB 2 278 582 A 12/1994
WO WO 98/03142 1/1998

* cited by examiner

*Primary Examiner*—Lesley Morris
*Assistant Examiner*—Michael R Stabley
(74) *Attorney, Agent, or Firm*—Wegman, Hessler & Vanderburg

(57) ABSTRACT

A propulsion apparatus (20) which can be mounted to a wheel (8) (or integrally formed therewith) of a vehicle, for example a wheelchair. The propulsion apparatus (20) has a first portion which can be statically attached to either a rim of the wheel (8) or structural member which is rigidly attached to the wheel (8) projects therefrom. The propulsion apparatus (20) also has a second portion (23), which is pivotal about the rotational axis of the wheel (8). Furthermore, the propulsion apparatus (20) comprises coupling means which are interposed between the first and second portions so that when the second portion (23) is rotated about the axis of the wheel (8) it causes the first portion, and therefore also the wheel (8), to rotate.

37 Claims, 23 Drawing Sheets

FIG. 13
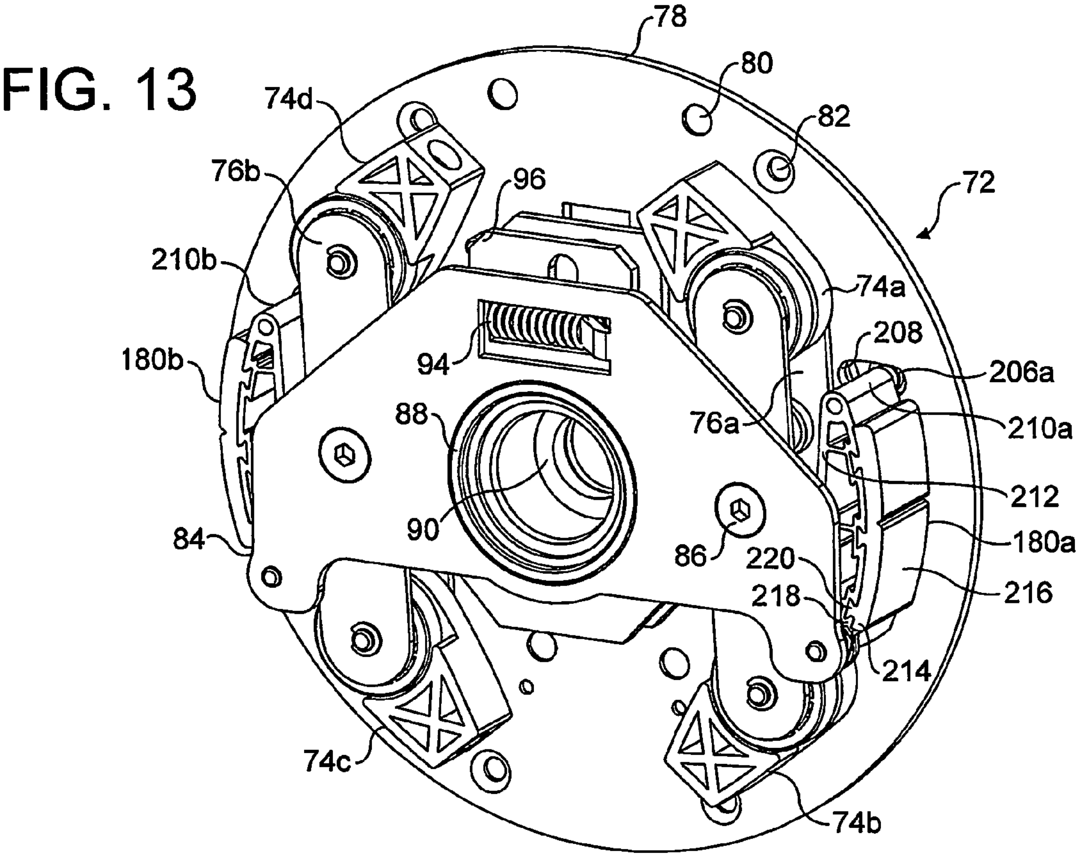
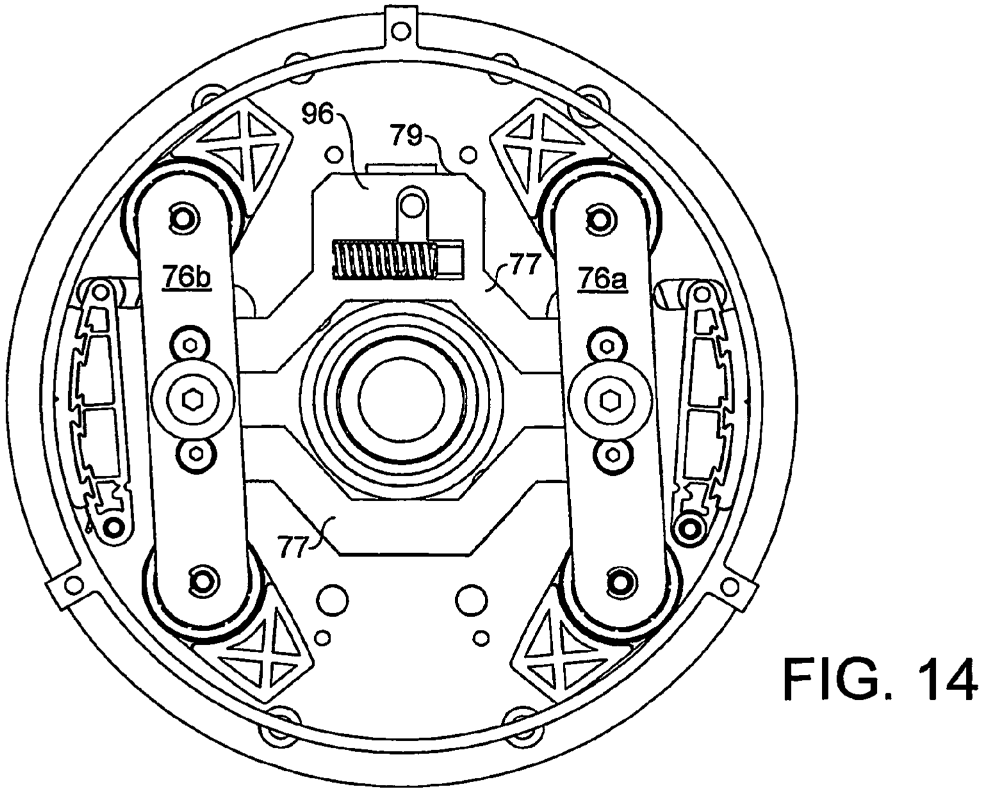
FIG. 14

PROPULSION AID

CROSS-REFERENCE TO RELATED APPLICATIONS

This application claims the priority filing benefit of International PCT Application PCT/GB2004/003848 filed Sep. 9, 2004, and published under PCT 21(2) in the English language; Great Britain Patent Application Serial No. 0321474.9 filed Sep. 12, 2003; and Great Britain Patent Application Serial No. 0406148.7 filed Mar. 18, 2004.

The present invention relates to an apparatus and method for propelling a vehicle. More specifically, but not exclusively, the apparatus and method relate to a propulsion aid for use with a wheelchair.

FIGS. 1*a* and 1*b* show a known method for propelling a wheelchair. The wheelchair 4 is provided with a seat for use by a wheelchair user 2, a pair of front wheels 6 and a pair of rear wheels 8 notably mounted to the wheelchair about an axle 12. An annular ring 10, known as a hand rim 10, is fixedly attached to each of the rear wheels 8, in such a way that the hand rim 10 is concentric with the wheel.

To facilitate movement of the wheelchair the wheelchair user 2 grips the hand rim 10 at a point substantially vertically above the axle 12 of the rear wheels 8, as shown in FIG. 1*a*. The user 2 then rotates the hand rims 10 in a forward direction. Since the hand rims 10 are fixedly attached to the rear wheels 8, rotation of the hand rims 10 causes rotation of the rear wheels of the wheelchair 4 in a forward direction. When the rear wheels 8 have moved through an angle of anything up to approximately 120°, the wheelchair user 2 releases his grip on the hand rims 10. The precise angle will vary depending on a number of factors, including; the range of movement of the wheelchair user, the desired speed of movement and any incline being ascended or descended. FIG. 1*b* illustrates the end point of the motion. When the user 2 releases his grip, the wheelchair 4 may continue to freewheel. To achieve continuous propulsion, the wheelchair user 2 returns to the beginning of the cycle and again grips the hand rims 10 above the axle 12 as shown in FIG. 1*a*, and repeats the motion described above.

To provide backwards motion, the wheelchair user 2 performs the reverse of the above motion, gripping the hand rims 10 at the point illustrated in FIG. 1*b* and rotating them towards the position shown in FIG. 1*a*.

If the wheelchair user 2 wants to turn the wheelchair 4, he grips one hand rim 10 at the end of the motion and the opposing hand rim 10 at the start of the motion. The hand rims 10 are then rotated in opposite directions and the wheelchair 4 turns accordingly.

To reduce the velocity of the wheelchair 4, or to stop the motion of the wheelchair, the user 2 grips the hand rims 10 as they rotate. This process introduces friction to the hand rims 10 and slows the wheelchair 4. If the grip is not released this action will eventually result in the wheelchair coming to a halt.

As will be appreciated, a great deal of upper body strength is required for a wheelchair user 2 to manoueuvre the wheelchair 4. Consequently, a wheelchair user 2 suffering from certain conditions, such as cerebral palsy, may be unable to propel a wheelchair 4 of this type. Furthermore, because a large amount of force may be required to propel the wheelchair 4, in particular when ascending inclines, the wheelchair user 2 may quickly become exhausted. Another problem is that since the wheelchair user 2 needs to adjust their grip on the hand rim 10 between the start and end of the motion they may get their fingers caught in the rear wheel 8, resulting in injury. In addition, the hands may suffer abrasion, or become dirty, from gripping the hand rims 10. An additional problem is that wheelchair users lacking grip strength, for example arthritis sufferers, may not be able to grip the hand rim sufficiently to transmit sufficient torque to the wheels In an attempt to overcome these problems a number of designs have been suggested which provide an alternative propulsion mechanism.

One such design is shown in U.S. Pat. No. 5,988,661, in which there is described a device for manually propelling a wheelchair. The device comprises a drive arm which is mounted to the wheel of the wheelchair so as to be manually pivotable by the wheelchair user about a pivot axis coincident with the axis of rotation of the wheel. The drive arm is mounted to the rear axle using an extended axle bolt, which replaces the originally provided axle bolt. However, one disadvantage of having to remove the original axle bolt is that axle dimensions differ between different designs of wheelchair the receiving aperture in the drive arm cannot be universally applicable. A second disadvantage is that it is not possible for the wheelchair user to be seated in the wheelchair while the drive arm is being fixed in place. A yet further disadvantage is that when the rear axle is removed, the wheels will require realigning and this may take some time. It is even possible that, since wheelchairs are subject to stringent regulatory controls, the replacement of an axle bolt will not be permitted if the wheelchair is to comply with the necessary regulatory controls. It would therefore be desirable to provide a mechanism which overcomes these disadvantages whilst still providing an improved propulsion device.

In GB-A-2278582 an alternative design is described in which a drive disc is fastened to the rear wheel of a wheelchair by a circular plate and a cylindrical casing. The cylindrical casing is attached to the spokes of the rear wheel by means of a plurality of chucks. These chucks project from an inner facing wall of the cylindrical casing and each receives a spoke of the rear wheel. After the chucks have been mounted to the spokes they are fastened using screws thereby firmly retaining the cylindrical casing to the wheel. As the drive disc is rotated, either by hand or by an insertable lever, torque is transferred to the spokes of the wheel causing the wheel to rotate. Although this design avoids the problem of the device being attached to the rear axle, it nevertheless produces forces on the spokes which they were not designed to withstand. In particular, the application of excessive torque may lead to buckling of the spokes. As will be appreciated, an alternative method of attaching an enhanced propulsion mechanism is required.

Broadly speaking, existing designs for providing enhanced propulsion to wheelchairs use one of two mechanisms for transmitting torque from a drive arm to the rear drive wheel. In the first group, a driving block transmits torque to the tyre of the rear wheel. For example, in GB-A-2213438 a device is described in which a driving block is pivotally mounted on a drive arm so that it is selectively engageable with the tyre of the rear wheel. Thus, pivoting the drive arm, with the driving block engaged on the tyre, rotates the wheel and propels the wheelchair. Similarly, U.S. Pat. No. 5,232,236 provides a leveraged hand propeller comprising a tyre engaging gripper (driving block) which, when engaged with the tyre, transmits sufficient torque to rotate the rear wheel.

An alternative means of transmitting torque is by providing a mechanism which engages with the hand rim of the rear wheel rather than with the tyre. In U.S. Pat. No. 5,988,661 there is described a mechanism comprising friction pads which, when hand pressure is applied to the drive arm, engage with the hand rim. Thus, when the drive arm is pivoted in a forward direction, torque is transmitted to the hand rim and the wheel rotates. In an alternative design described in WO 98/03142 there is provided a propulsion assembly which includes a lever arm and a crank handle at the end of the lever arm. The crank handle further comprises friction pads for engaging the hand rims of the wheelchair. When the occupant of the wheelchair applies a force in a forward direction relative to the wheelchair frame the friction pads come into contact with the hand rims. Continued forward motion causes the hand rims to move in a forward direction and the wheelchair will advance.

There are a number of problems associated with both of the above methods. Firstly, neither the tyres nor the hand rims were designed to be subjected to the frictional forces required to transmit sufficient torque to cause rotation of the rear wheels. There is therefore a risk that the force applied through the driving blocks/frictional pads will damage these components. In particular, the hand rims are not usually fixed to the wheel in such a way as to withstand the rotational and frictional forces required to produce rotation of the rear wheels in this manner. In addition, the hand rims and tyres may suffer severe wear from the frictional pads which may in turn compromise the functionality of the wheelchair. Excess wear will also result in the components requiring more frequent replacement than would otherwise be necessary. It would therefore be desirable to provide an enhanced propulsion mechanism which overcomes the problems associated with the prior art methods of torque transmission.

A number of designs have been previously disclosed which are able to provide propulsion in both the forward and reverse directions. WO 98/03142 describes a manual propulsion assembly in which the top of the lever arm provides a hand grip which can be rotated between a first position to provide forward motion and a second position to provide rearward motion. However, constant pressure is required to maintain the frictional pad in contact with the tyre during either forward or rearward motion while, in order to return the lever arm to the starting position, it is necessary to release this pressure. This means that frequent movement of the wrist is required to engage and disengage the frictional pads. In addition, wrist strength is required to maintain the frictional pad in contact with the tyre to enable torque transmission. Similarly, U.S. Pat. No. 5,988,661 describes an assembly where a wheelchair user is required to apply hand pressure to the drive arm to force the frictional pads into contact with the hand rim of the wheelchair. In order to allow the drive arm to return to the start of its travel the hand pressure is released from the lever. Therefore, once again a repeated gripping motion is required to actuate the device. One problem in using such devices is that the repeated gripping motion may cause repetitive strain injury in users. It is also possible that wheelchair users may not have sufficient hand or wrist strength to enable them to provide the necessary pressure for engagement of the frictional pads with either the tyres or the hand rims. It would therefore be desirable to provide an improved mechanism which does not require so much strength in the hands or wrist of the wheelchair user and which reduces the risk of repetitive strain injury.

In addition, it would also be desirable to provide a handle which provides enhanced hand/arm ergonomics during use of the propulsion apparatus.

SUMMARY OF THE INVENTION

According to a first aspect of the present invention there is provided a propulsion apparatus mountable to a vehicle, the vehicle comprising at least one ground engaging wheel having an axis of rotation and the propulsion apparatus comprising; a first portion adapted to be statically attached at a location remote from said axis to either a rim of said wheel or to a structural member projecting from a plane defined by said wheel, the structural member being rigidly attached to the wheel; a second portion pivotal about an axis coincident with said rotational axis of said wheel; and coupling means interposed between said first and second portion such that pivotal movement of said second portion about said axis causes said first portion to rotate thereby propelling the vehicle.

Preferably the first portion carries means for location of said second portion such that the axis of rotation of the second portion is coincident with the axis of the wheel.

According to a second aspect of the present invention there is provided a propulsion apparatus for a vehicle, the vehicle comprising at least one ground engaging wheel and the propulsion apparatus comprising: a first portion adapted to be mounted to or formed integrally with the wheel; a second portion drivingly connected to said first portion and pivotable about an axis coincident with a rotational axis of said wheel; one of said first and second portions comprising a continuous contact surface; and coupling means carried by either the first or the second portion and selectively engageable with said continuous contact surface such that, when engaged, pivotal movement of the second portion about said axis causes said first portion to rotate thereby propelling the vehicle.

In one embodiment the first portion comprises the continuous contact surface and the coupling means is carried by the second portion.

In an alternative embodiment the second portion comprises the continuous contact surface and the coupling means is carried by the second portion; and said apparatus further comprises means to key the contact surface with respect to the first portion.

According to a third aspect of the present invention there is provided a wheel of a vehicle comprising: a first portion statically mounted to or formed integrally with said wheel, the first portion comprising a lever arm receiving portion and a continuous contact surface, the lever arm receiving portion being adaptable to receive a lever arm such that the lever arm is pivotable about an axis coincident with an axis of rotation of said wheel; the continuous contact surface being adapted to be selectively engageable with coupling means carried by said lever arm such that, when engaged, pivotal movement of the lever arm about said axis causes the wheel to rotate thereby propelling the vehicle.

According to a fourth aspect of the present invention there is provided a propulsion apparatus mountable to a vehicle, the vehicle comprising at least one ground engaging wheel and the propulsion apparatus comprising a first portion adapted to be mounted to the wheel or formed integrally therewith; a second portion comprising a lever arm pivotable about a first axis coincident with a rotational axis of the wheel; and coupling means interposed between said first and second portions such that pivotal movement of said lever arm about said first axis causes said first portion to rotate thereby propelling the vehicle; the lever arm having a handle pivotable about a second axis transverse to a longitudinal axis of the lever arm so as to provide an ergonomic hand movement for a user.

Advantageously the first portion or the second portion has a continuous contact surface and the coupling means is carried by either the first portion or the second portion, the coupling means being selectively engageable with the continuous contact surface such that, when engaged, pivotal movement of the second portion about said axis causes said first portion to rotate thereby propelling the vehicle.

Advantageously the first portion is adapted to be statically attached at a location remote from said axis to either a rim of said wheel or to a structural member projecting from a plane defined by said wheel, the structural member being rigidly attached to the wheel.

Preferably the second portion comprises a lever arm.

More preferably the lever arm comprises a handle, the handle being pivotable about an axis transverse to a longitudinal axis of the lever arm, so as to provide an ergonomic hand movement for a user.

Preferably the first portion is statically attached to the wheel at discrete locations.

Preferably the first portion is statically attached to said wheel by a plurality of attachment spokes, said attachment spokes being radially extendable from a central hub.

More preferably, said attachment spokes are provided at an end remote from said hub with a respective channel shaped member adapted to at least partially receive said rim or structural member.

In one configuration the channel shaped members preferably include a deformable insert adapted to conform under compression to the shape of said rim or structural member.

Preferably the deformable insert is formed of a high friction material.

Advantageously the attachment spokes are pivotally connected at a radially inner end to a respective intermediate member and said intermediate members are pivotally connected to a hub mounted actuating member at circumferentially spaced locations, the attachment spokes being constrained for radial motion such that rotation of the actuating member causes the attachment spokes to extend or retract depending on the sense of the rotation and the extent of rotation of the actuating member may be limited by the engagement of a projection within a slot.

In a preferred embodiment in moving the attachment spokes from a retracted position to a fully extended position, the location at which each intermediate member is pivotally connected to the actuating member moves circumferentially past the location at which the same intermediate member is pivotally connected to the associated attachment spoke such that the attachment spokes are retained in the fully extended position by means of an over-centering arrangement.

Advantageously, the second portion is releasably connectable to said first portion.

Preferably the coupling means comprises rolling support means adapted to frictionally engage the continuous contact surface.

In a preferred embodiment when the second portion is pivoted about said axis in a first direction, the rolling support means is selectable to frictionally engage the continuous contact surface to cause the rotation of the first portion in one sense and, when the second portion is pivoted about said axis in a second direction, opposite to said first direction, the rolling support means is selectable frictionally engage the continuous contact surface and cause the rotation of the first portion in an opposite sense.

Advantageously, the coupling means comprises a pair of drive surfaces disposed on opposite sides of a pivot such that only one of said drive surfaces may be brought into frictional engagement with the continuous contact surface at a time.

Preferably as the second portion is pivoted about said axis, the engagement of one of said pair of drive surfaces with the continuous contact surface causes the rotation of the first portion in a first sense while the engagement of the other of said pair of drive surfaces with the continuous contact surface causes the rotation of the first portion in the opposite sense.

More preferably one of said pair of drive surfaces is biased towards the continuous contact surface in preference to the other, the biased drive surface engaging the continuous contact surface to propel the vehicle in a forward direction upon pivotal movement of the second portion about said axis. The biasing of said one of said drive surfaces may be overcome by selective manipulation of a handle and the handle may be adapted so that said manipulation is by the rotation of said handle about a longitudinal axis of said lever arm.

Advantageously each drive surface is associated with a respective rolling support means, the rolling support means contacting the continuous contact surface when said associated drive surface is in the proximity of the continuous contact surface, the rolling support means and associated drive surface being coupled such that the drive surface frictionally engages with the continuous contact surface when the associated rolling support means is rotated in a first direction and disengages the continuous contact surface when the associated rolling support means is rotated in an opposite direction.

Preferably a second pair of drive surfaces disposed on opposite sides of a second pivot, the two pairs of drive surfaces being pivotally interconnected so as to form a parallelogram-type mechanism in which diagonally opposite drive surfaces move together into and out of frictional engagement with the continuous contact surface.

In a preferred embodiment, the second portion comprises two or more parts, at least one of the parts being releasably connectable to said other parts.

Advantageously the invention also provides a variable drive ratio of propulsion speed of the vehicle to power input by a user of said vehicle. In a preferred embodiment the lever arm is adapted to have a working length that is selectively adjustable such that as the working length of the lever arm is adjusted a drive ratio of propulsion speed of the vehicle to power input by a user of said vehicle is varied.

Advantageously, the lever arm is collapsible from an in use configuration to a stored configuration such that when collapsed said lever arm has a radial extent less than the radius of said wheel.

Preferably at least a part of said lever arm is adapted to collapse telescopically.

Alternatively or additionally the lever arm may further comprise a hinge at a location spaced radially inwardly of the rim of the wheel.

In a preferred embodiment the handle of the lever arm comprises an arcuate housing fixedly attached to one end of the lever arm and a D-shaped grip comprising an arcuate portion slidably received within the arcuate housing and a grip portion external of the arcuate housing and interconnecting opposite ends of the arcuate portion.

Preferably the handle rotates inwardly to provide a means of selectively engaging and disengaging said coupling means.

Advantageously the second portion further comprises a brake, said brake comprising at least one braking surface moveable between an operable position, in which the braking surface engages the continuous contact surface to slow rotation, and an inoperable position, in which the braking surface is not so engaged; and means for selectively moving said braking surface between said operable and inoperable positions. Preferably the means for activating said brake are provided on said handle.

In a preferred embodiment the handle is movable about the axis transverse to the longitudinal axis of the lever arm such that movement of the handle to an activating position provides the means for activating said brake. Alternatively, the braking means are provided on said lever arm, said lever arm being inwardly pivotable such that said braking means is brought into contact with said wheel or said structural member.

According to a fifth aspect of the present invention there is provided a vehicle having at least one ground engaging wheel and a propulsion apparatus as previously discussed.

Preferably a separate propulsion apparatus is provided on opposite sides of said vehicle. More preferably the vehicle is a wheelchair.

According to a sixth aspect of the present invention there is provided a lever arm for use with a vehicle, the vehicle comprising at least one ground engaging wheel and a lever arm receiving portion statically mounted to or formed integrally with said wheel, one of said lever arm and said lever arm receiving portion comprising a continuous contact surface, said lever arm being detachably mountable to said lever arm receiving portion, so as to be pivotable about an axis coincident with an axis of rotation of said wheel and carrying coupling means selectively engageable with said continuous contact surface such that, when engaged, pivotal movement of the lever arm about said axis causes the wheel to rotate thereby propelling the vehicle.

Advantageously the lever arm comprises a handle pivotal about a second axis transverse to a longitudinal axis of said lever arm so as to provide an ergonomic hand movement for a user.

Advantageously the lever arm is releasably connectable to said lever arm receiving portion.

The lever arm may carry coupling means in any form previously described.

Preferably the lever arm comprises two or more parts, one of said parts being releasably connectable to said other parts.

Advantageously the lever arm is adapted to have a working length that is selectively adjustable such that as the working length of the lever arm is adjusted a drive ratio of propulsion speed of the vehicle to power output by said user of said vehicle is varied.

Advantageously the lever arm as claimed in any of claims 45 to 49, wherein said lever arm is collapsible from an in use configuration to a stored configuration such that when collapsed said lever arm has a radial extent less than the radius of said wheel.

In a preferred embodiment at least a part of said lever arm adapted to collapse telescopically. Alternatively or additionally the lever arm further comprises a hinge at a location spaced radially inwardly of the rim of the wheel.

Preferably the handle comprises an arcuate housing fixedly attached to one end of the lever arm and a D-shaped grip comprising an arcuate portion slidably received within the arcuate housing and a grip portion external of the arcuate housing and interconnecting opposite ends of the arcuate portion.

Preferably the handle rotates inwardly to provide a means of engaging and disengaging said coupling means.

Advantageously the lever arm further comprises a brake, said brake comprising at least one braking surface moveable between an operable position, in which the braking surface engages the continuous contact surface to slow rotation, and an inoperable position, in which the braking surface is not so engaged; and means for selectively moving said braking surface between said operable and inoperable positions. Preferably the means for activating said brake are provided on the handle. More preferably the handle is moveable about the axis transverse to the longitudinal axis of the lever arm such that movement of the handle to an activating position provides the means for activating said brake.

Alternatively braking means are provided on said lever arm, said lever arm being inwardly rotatable such that said braking means is brought into contact with said wheel or a structural member positioned from the plane of said wheel.

According to a seventh aspect of the present invention there is provided a method of propelling a vehicle, the method comprising the steps of:

a) providing a propulsion apparatus as claimed in any of claims 1, 3, 6 or 7;

b) connecting said propulsion apparatus to said wheel;

c) pivoting said second portion of the propulsion apparatus such that said first portion of the propulsion apparatus is rotated, thereby rotating the wheel.

BRIEF DESCRIPTION OF THE DRAWINGS

Preferred embodiments of the invention will now be described, by way of example, with reference to the accompanying drawings, in which:

FIG. 13 shows a perspective view of a drive mechanism according to the present invention;

FIG. 14 shows a plan view of the drive mechanism of FIG. 13 with a front plate of the drive mechanism removed for clarity;

DETAILED DESCRIPTION OF PREFERRED EMBODIMENTS OF THE PRESENT INVENTION

Figure 1A:
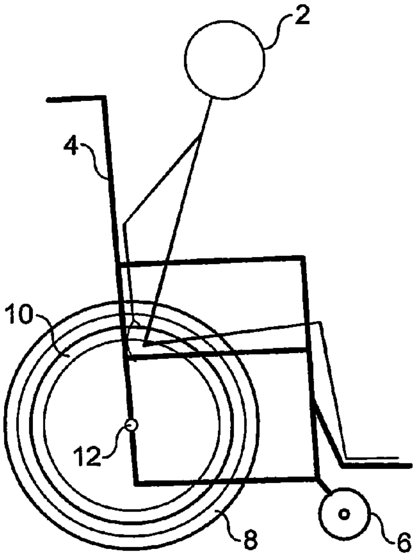
FIGS. 1*a* and 1*b* show a wheelchair user propelling a wheelchair according to a known method.
Figure 1B:
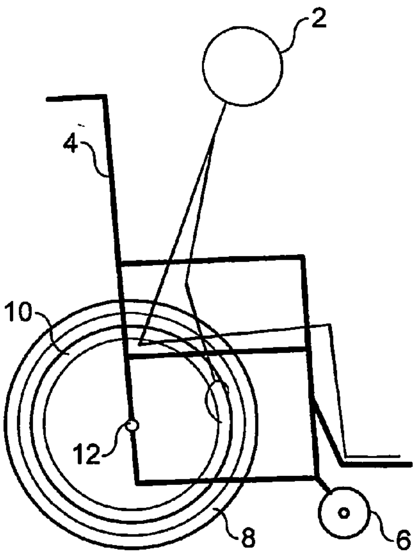

As previously discussed, FIGS. 1*a* and 1*b* show a wheelchair 4, which is provided with a seat for use by a wheelchair user 2, a pair of front wheels 6 and a pair of rear wheels 8 rotatably mounted to the wheelchair about an axle 12. The wheelchair 4 shown in FIGS. 1*a* and 1*b* is also provided with a pair of hand rims 10.

Figure 2:
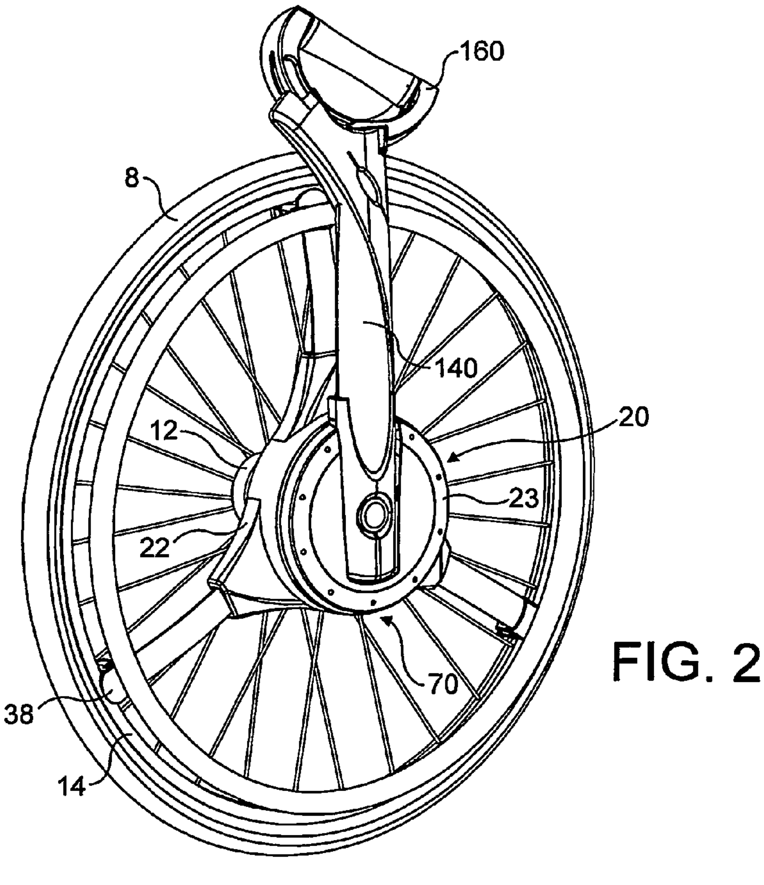
FIG. 2 shows a perspective view of a rear wheel of a wheelchair in combination with a propulsion apparatus, the propulsion apparatus being in accordance with a preferred embodiment of the present invention.

FIG. 2 shows a rear wheel 8 of a wheelchair 4 in combination with a propulsion apparatus 20 in accordance with the present invention.

The propulsion apparatus 20 comprises a hub portion 22 and a second portion 23. The second portion 23 comprises a drive mechanism containment portion 70, a lever arm 140 and a handle 160 at an end of the lever arm remote from the drive mechanism containment portion.

Although the propulsion apparatus 20 may be formed separately from the wheel, thereby enabling the propulsion apparatus to be retrofitted to existing wheelchairs, it will be understood that in other embodiments the propulsion apparatus may be formed as part of the wheel assembly so as not to be separable therefrom.

Figure 3:
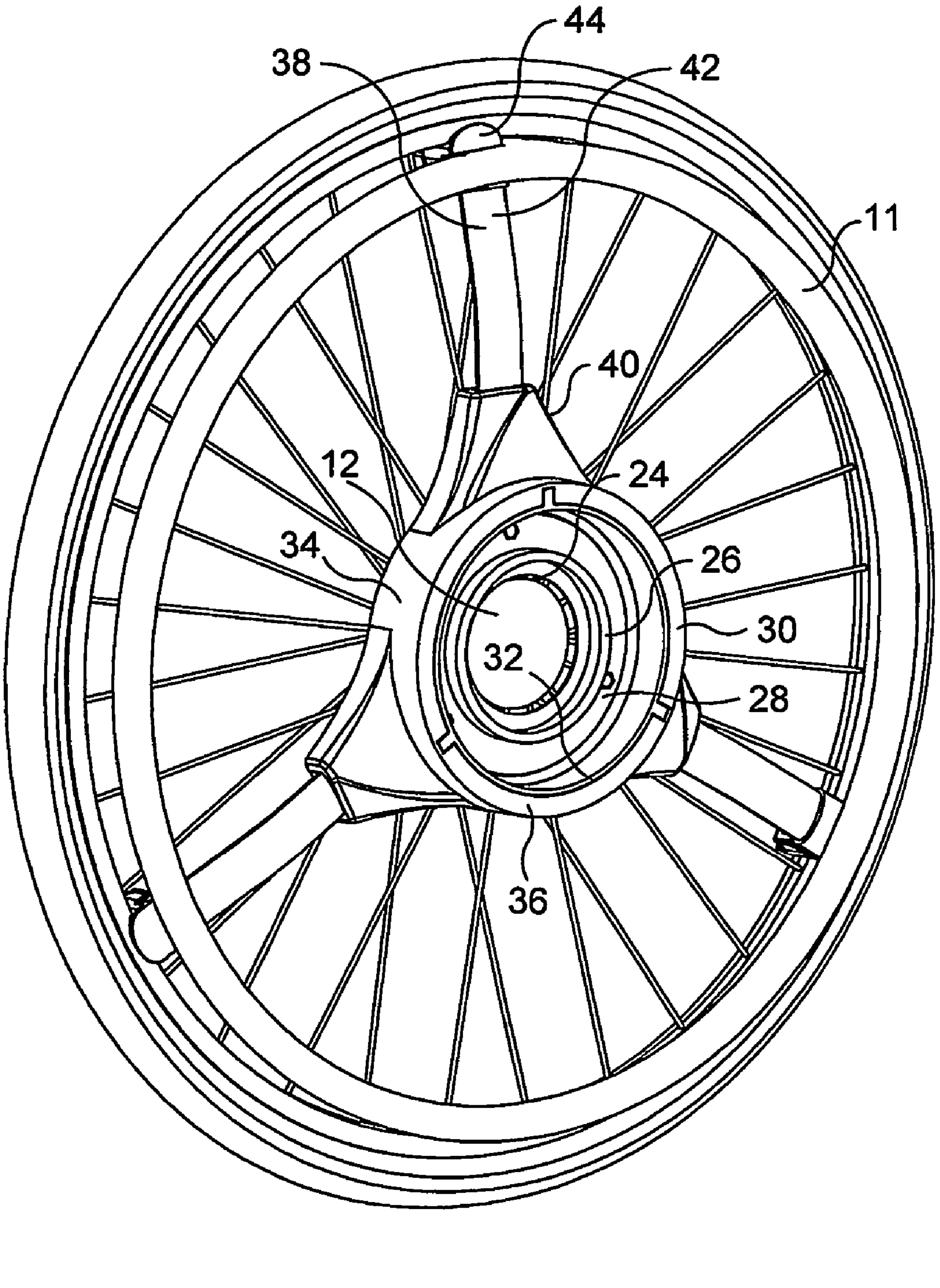
FIG. 3 shows a perspective view of a first embodiment of a hub portion of a propulsion apparatus according to the present invention.

FIG. 3 shows the hub portion 22 without the second portion 23 attached. As can be seen, the hub portion 22 comprises a circular aperture 24, bounded by an outwardly extending cylindrical wall 26. The hub portion 22 is positioned such that the centre of the aperture 24 lies on an axis defined by the axle 12 of the rear wheel 8. An annular flange 28 extends radially outwardly from the cylindrical wall 26 and merges with an outwardly extending annular hub rim 30, defined by a radially inner surface 32 and a radially outer surface 34. The radially inner surface 32 is connected to the radially outer surface 34 by a rim surface 36. While the hub rim 30 is concentric with the cylindrical wall 26.

The hub portion 22 further comprises a plurality of hub attachment spokes 38. Each hub attachment spoke 38 comprises a base portion 40 and an attachment arm 42, the base portion being formed integrally with and merging with the outer surface 34 of the hub portion 22. The attachment arm 42 is carried by the base portion 40 and extends radially outwardly therefrom to terminate in a trough shaped moulding 44 remote from the hub portion 22.

Figure 4A:
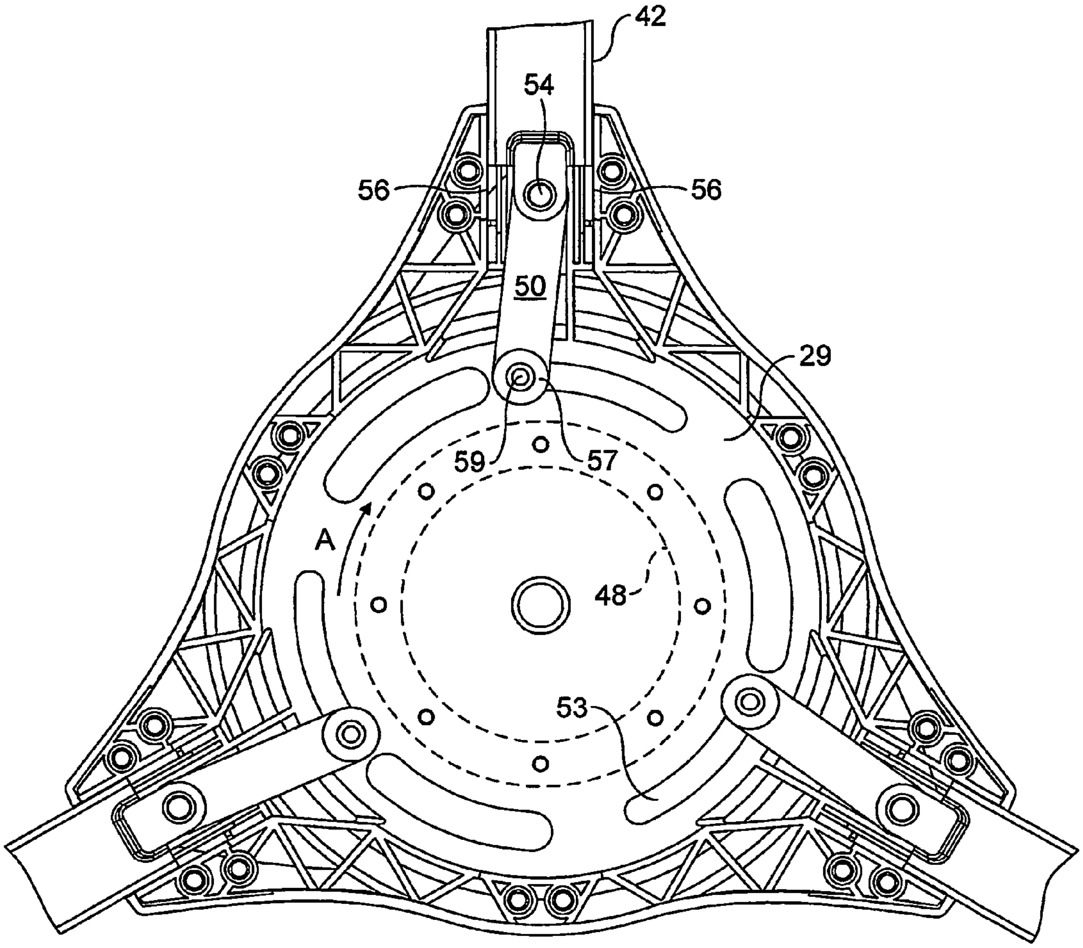
FIG. 4*a* shows a rear view of the hub portion of FIG. 3, with a back plate of the hub portion removed and an actuating disc shown in ghost.
Figure 4B:
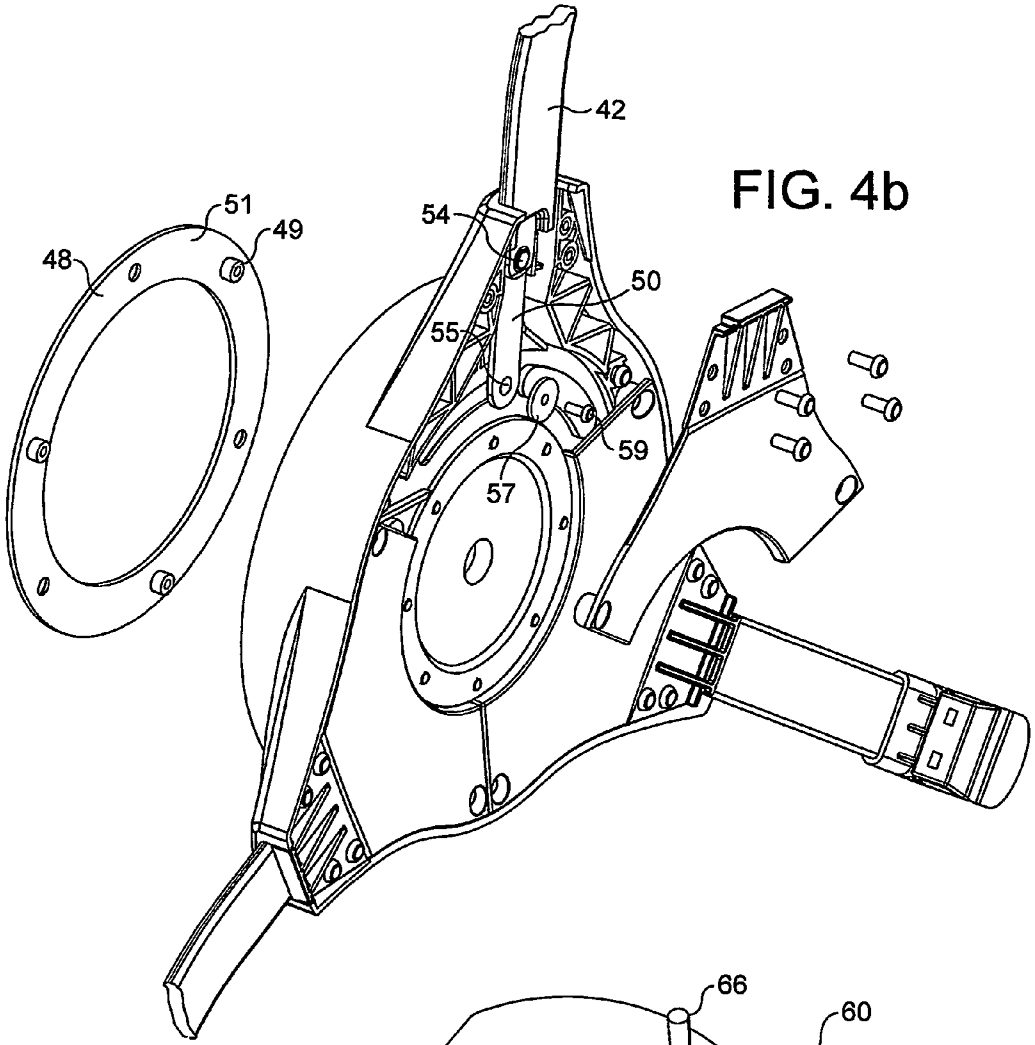
FIG. 4*b* shows an exploded view of the hub portion of FIG. 3.

An example of a suitable mechanism for attaching the hub part 22 to the rear wheel 18 is shown in FIGS. 4*a* and 4*b*. In this example an actuating disc 48 is provided in the hub portion 22 and is located on an outwardly facing surface 29 of the flange 28. As shown in FIG. 4*b*, the actuating disc 48 has projections 49 which extend inwardly from a rear surface 51 of the actuating disc towards the hub portion 22. Although three projections 49 are shown, it will be understood that the number of projections may vary depending on the number of attachment arms 42. Turning to FIG. 4, the flange 28 is provided with a number of cutout sections 53 arranged circumferentially about the central axis. Although the cutout sections 53 are shown to have an arcuate form it will be understood that they may take other forms and may, for example be rectangular cutouts and arranged tangentially at spaced locations about a circumference. Although there are six cutout sections 53 shown in FIG. 4*a*, it will be understood that the number of cutout sections may vary. For example, there may be three cutout sections 53 corresponding to the three attachment arms 42. The projections 49 extend through a respective one of the cutout sections 53 where upon they are pivotally connected to one end of a respective projecting plate 50. Each projecting plate 50 acts as a first toggle plate and the number of projecting plates 50 correspond to the number of hub attachment spokes 38. Each projecting plate 50 is pivotally connected at an end remote from the projection 49 to a respective one of the attachment arms 42 using a toggle joint 54. The attachment arms 42 are constrained to reciprocate in a radial direction by a restraining guide 56 provided within the base portion 40. The actuating disc 48 further comprises circumferentially spaced tool location apertures 52 which are adapted to receive a corresponding number of tool projections 66 of a tool 60 shown in FIG. 5. Although three tool location apertures 52 are shown, it will be understood that the number and spacing of these tool location apertures may vary.

Figure 5:
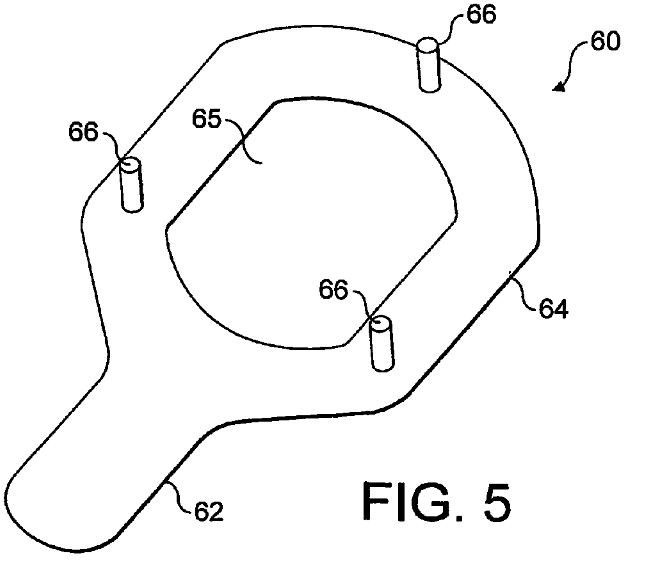
FIG. 5 shows a perspective view of a tool for use with the actuating disc of FIG. 4*a;*

The tool shown in FIG. 5 is made of a one piece construction and is sized to fit within the hub rim 30. The tool 60 comprises a handle 62 and a body 64 having a central aperture 65. The aperture 65 is sized to allow the cylindrical wall 26 of the hub portion 22 to protrude therethrough when the tool 60 is being used to attach the hub portion 22 to the rear wheel 8. A plurality of tool projections 66 are provided to correspond with the tool location apertures 52 provided in the actuating disc 48.

Figure 6A:
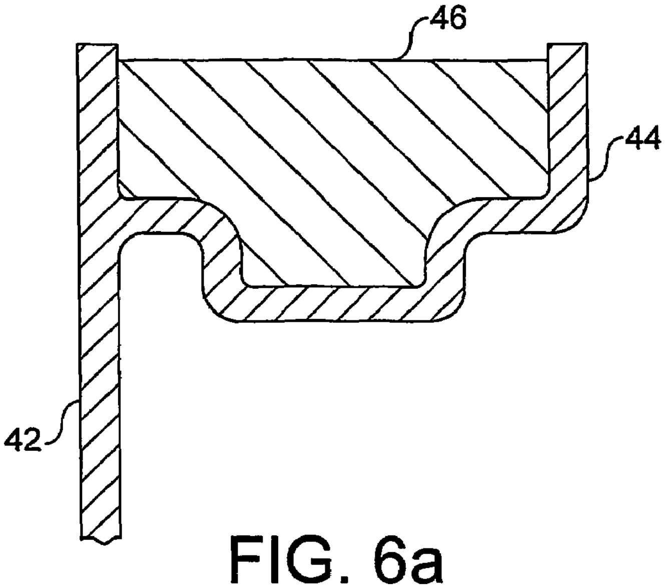
FIG. 6*a* shows a sectional view through a trough shaped moulding in contact with a rim of the rear wheel.
Figure 6B:
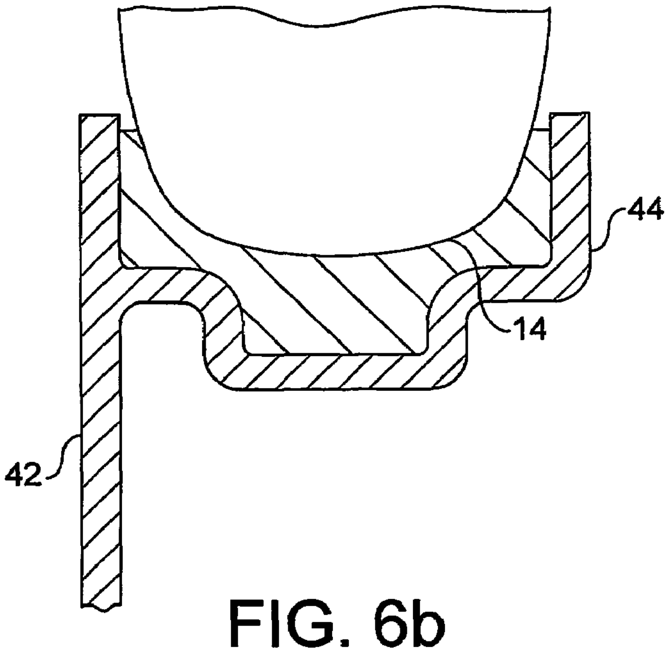
FIG. 6*b* shows a sectional view of the trough shaped moulding of FIG. 6*a* not in contact with the rear wheel.

A trough shaped moulding 44 provided at one end of an attachment arm 42 is shown in more detail in FIGS. 6*a* and 6*b*. FIG. 6*a* shows a section through the trough shaped moulding 44 prior to the moulding being brought into contact with an inner rim 14 of the rear wheel 8. The trough shaped moulding 44 may be designed to correspond to the shape of a specific inner rim 14. However, to provide enhanced attachment characteristics and to negate the requirement for a specifically shaped moulding, the trough shaped moulding 44 is preferably provided with a moulding insert 46 which is made of a material capable of conforming to the shape of the inner rim 14. Preferably the moulding insert 46 is formed of a high-friction material such as polyurethane to provide enhanced attachment properties. The moulding insert 46 may be retained within the trough shaped moulding 44 by any known means such as, for example, by means of an adhesive. Alternatively or in addition the moulding insert 46 may be keyed into the trough shaped moulding 44. In another arrangement, the moulding insert 46 may simply be placed in position prior to use thereby relying on the high friction characteristic of the material for the retention of the insert within the moulding.

FIG. 6*b* shows the trough shaped moulding 44 in contact with the inner rim 14 of the rear wheel 8 and under compression. It will be noted that the moulding insert 46 has taken up a shape which conforms to the inner rim 14.

The method of attaching the hub portion 22 to the rear wheel 8 will now be described with reference to FIGS. 4 to 6.

In order to attach the hub portion 22 to the rear wheel 8 the tool 60 is orientated such that the projections 66 are received within the tool location apertures 52 and the cylindrical wall 26 is received within the aperture 65. The hub portion 22 and tool 60 are then offered up to the rear wheel of a wheelchair so that the axle 12 passes through or else is aligned with circular aperture 24. The tool 60 is then rotated in the direction shown by arrow A in FIG. 4*a*. As the actuating disc 48 rotates it actuates the toggle joints 54 causing the constrained attachment arms 42 to slide in a radially outwardly direction with respect to the base portions 40. As the attachment arms 42 extend radially outwardly the trough shaped mouldings 44, and the moulding inserts 46 contained therein, are brought into contact with the inner rim 14 of the rear wheel 8. The contact force between the attachment arm 42 and the wheel 8 causes the moulding insert 46 to conform to the shape of the inner rim 14. The tool 60 is then removed and the over-centering effect of the toggle joints 54 retains the attachment arms 42 in the extended position, thereby selectively retaining the hub portion 22 with respect to the rear wheel 8 and maintaining the moulding inserts 46 in static contact with the inner rim 14.

The hub portion 22 may be removed from the wheel 8 by inserting the tool 60 and rotating the actuating disc 48 in the opposite direction to return the attachment arms 42 to their retracted positions.

Although the hub portion 22 is shown as having three hub attachment spokes 38, regularly spaced at 120° intervals, it will be apparent that the number and spacing of the hub attachment spokes can be varied and still provide a suitable fixation to the inner rim 14 of the rear wheel 8. Likewise, it will be apparent that the hub portion 22 may alternatively be attached to the hand rim 10 using the same method as described above. In this alternative, the trough shaped moulding 44 will be sized to fit around an inner rim 11 of the hand rim 10.

As stated previously, in another embodiment the propulsion apparatus 20 may be permanently attached to the rear wheel 8 of the wheelchair 4. Under such circumstances the hub attachment spokes 38 may be formed integrally with the wheel rim 14 or permanently attached using a method such as welding. It will also be apparent that other methods of releasably attaching the hub portion 22 to the inner rims 14 or 11 are envisaged, for example by the use of screws. In any event, the hub portion 22 may be incorporated in the wheel design and permanently attached to the wheel.

Figure 7:
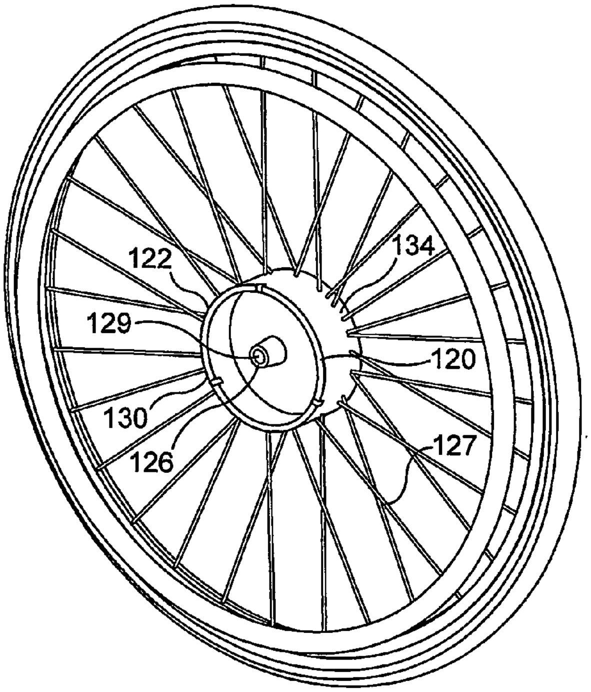
FIG. 7 shows a perspective view of a further embodiment of a hub portion, formed integrally with a wheel, of a propulsion apparatus according to the present invention.

FIG. 7 shows an embodiment of the present invention where a propulsion apparatus 120 is formed as part of the wheel assembly. Since many features of the propulsion apparatus 120 are comparable to those of propulsion apparatus 20, the same reference numerals will be used with the stem numeral '1' being used to indicate this embodiment.

This embodiment differs from the previously discussed embodiments in that there are no hub attachment spokes for securing the hub portion 122 to the wheel. Instead, the hub portion 122 forms an integral part of the wheel hub, with wheel spokes 127 radiating from the outer surface 134 of an annular hub rim 130.

At the centre of the hub portion 122 an aperture 129 allows the wheel to be fixed to the axle using any acceptable method, for example by utilization of a nut or screw.

The hub portion 122 may further comprise an inner cylinder 126, this inner cylinder is configured to allow access to the axle for the purpose of attaching the wheel to wheelchair, but is otherwise configured in a similar fashion to that discussed in relation to the previous embodiment.

FIG. 7 shows the hub portion 122 without the second portion 23 attached for clarity. However, the second portion 23, may be releasably connectable to or integral with the hub portion 122. It will be understood that all the variations discussed subsequently in relation to the second portion 23, drive mechanism 70 and the relationship of the second portion 23 to the hub portion 22 are envisaged as being suitable for use with any of the previously discussed embodiments of the hub portion 22 or 122.

Figure 8:
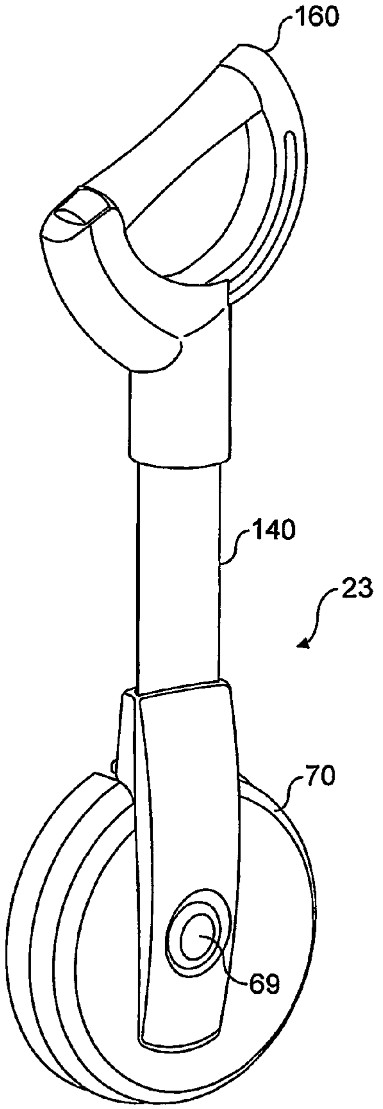
FIG. 8 shows a perspective view of second component of the propulsion apparatus according to the present invention.
Figure 9A:
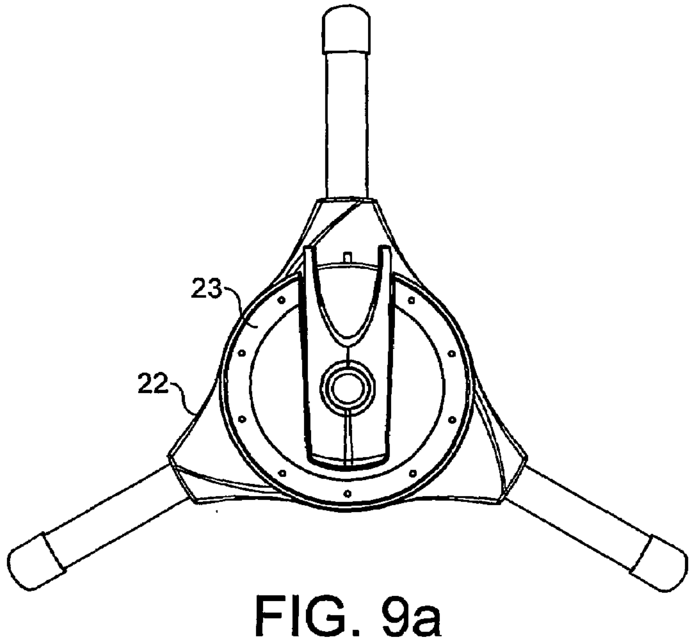
FIG. 9*a* shows a front view of a propulsion apparatus according to the present invention and having a partially removable lever arm part.
Figure 9B:
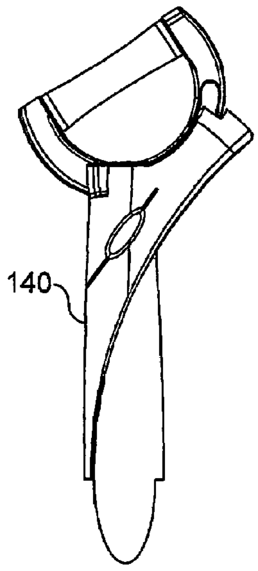
FIG. 9*b* shows a front view of the removable lever arm part of FIGS. 9*a* and 9*c;*
Figure 9C:
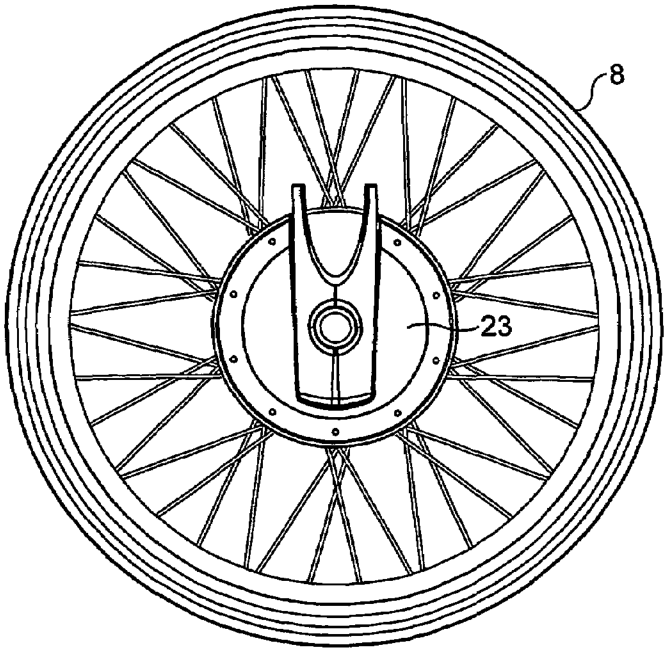
FIG. 9*c* shows a front view of a wheel according to the present invention having an integral lever arm receiving portion and a lever arm portion which has a part of the lever arm being removable.
Figure 10A:
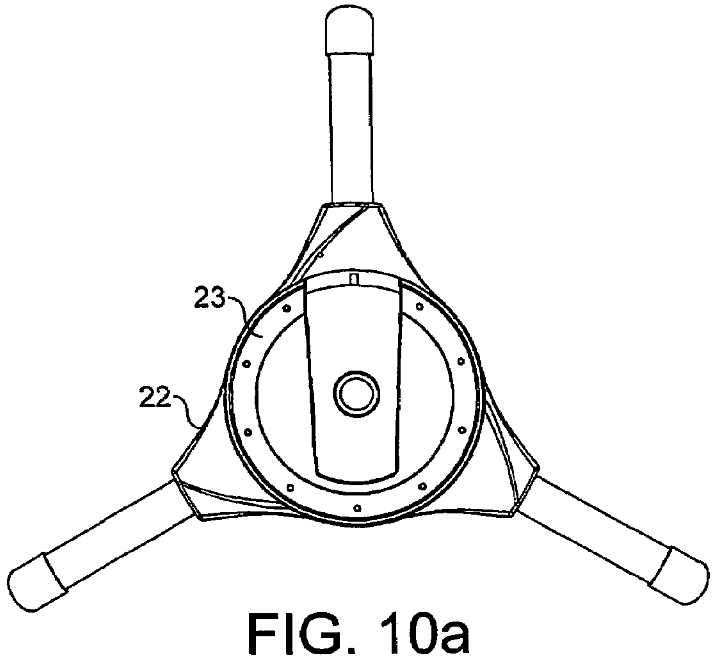
FIG. 10*a* shows a further embodiment of a propulsion apparatus having a partially removable lever arm part.
Figure 10B:
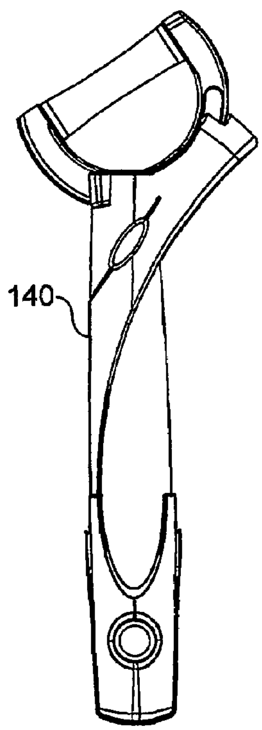
FIG. 10*b* shows a front view of the removable lever arm part of FIGS. 10*a* and 10*c;*
Figure 10C:
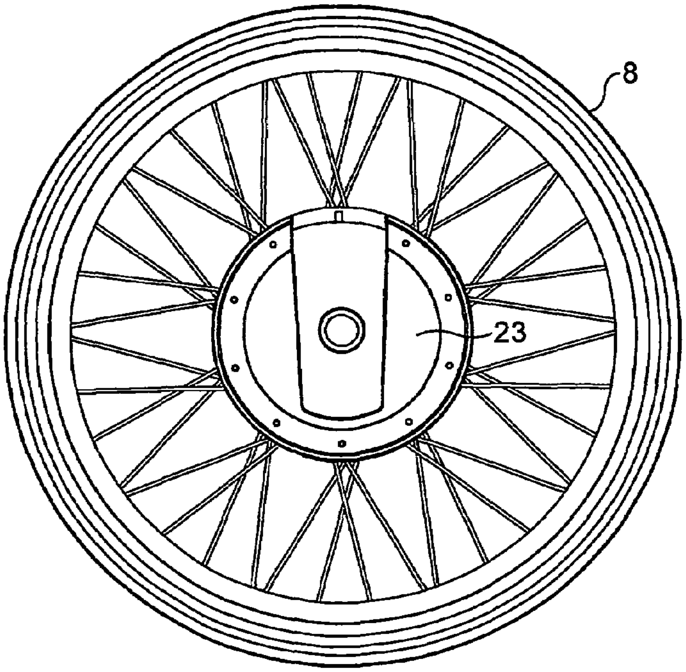
FIG. 10*c* shows a front view of a wheel according to a further embodiment having an integral lever arm receiving portion and a lever arm portion which has a part of the lever arm being removable.

FIG. 8 shows the second portion 23 of the propulsion apparatus 20. As previously mentioned, although this second portion 23 is shown as being separable from the hub portion 22, it is to be understood that the propulsion apparatus 20 may be so adapted that the second component 23 is not removable from the hub portion 22.

However, one advantage of providing a two piece propulsion apparatus 20 is that the second portion 23 may be removed and the wheelchair 4 will then revert to the functionality of the traditional wheelchair design depicted in FIGS. 1*a* and 1*b*. Alternatively, the second portion 23 may be made up of two or more parts and these parts can be releasably connectable. For example a part or whole of the lever arm 140 may be removable, when removed the drive mechanism containment portion 70 will remain attached to the hub portion 22. Examples of configurations in which either the whole or a part of the lever arm 140 is removed are shown in FIGS. 9A, 9B, and 9C and 10A, 10B and 10C. It will be understood that there are other configurations which can be used in addition to those shown in the aforementioned Figures. An alternative method of achieving this is to provide a lever arm 140 which is provided with a hinge at a point radially inward of the hand rim 10. This would enable the lever arm 140 to be folded into a compact configuration allowing access to the hand rim 10, while negating the requirement to physically remove the second portion 23 from the wheelchair. A further alternative would be to form the handle of an outer member and an inner member telescopically received within the outer member (not shown). When the handle is in use, the inner member may be extended and secured in a usable length using any suitable method. For example, ball bearings locatable in apertures on the outer member. When the lever is not in use and it is desired to revert the wheelchair to the functionality of the traditional wheelchair design the inner member may be telescopically received within the outer member, and preferably secured, to reduce the length of the lever to less than the radius of the hand rim 10 or wheel 8 as desired.

Figure 11A:
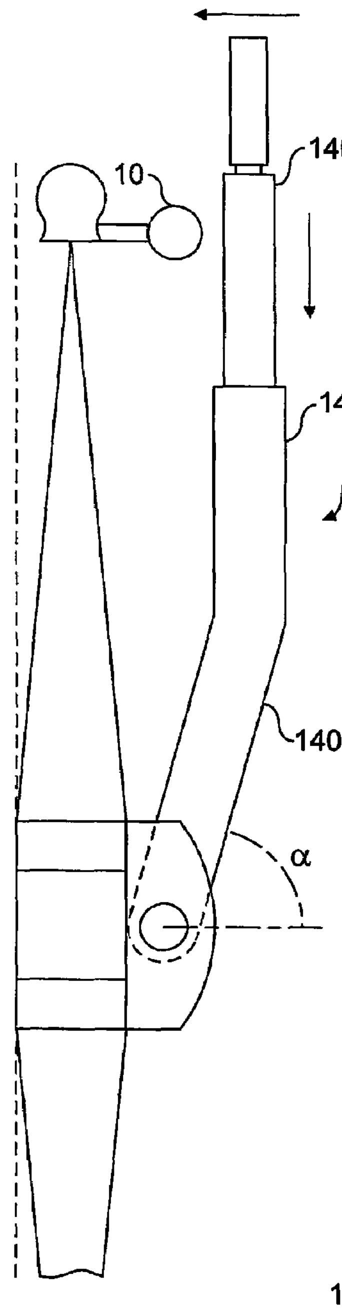
FIG. 11*a* shows a side view of a propulsion apparatus having collapsible lever arm in an operable position.
Figure 11B:
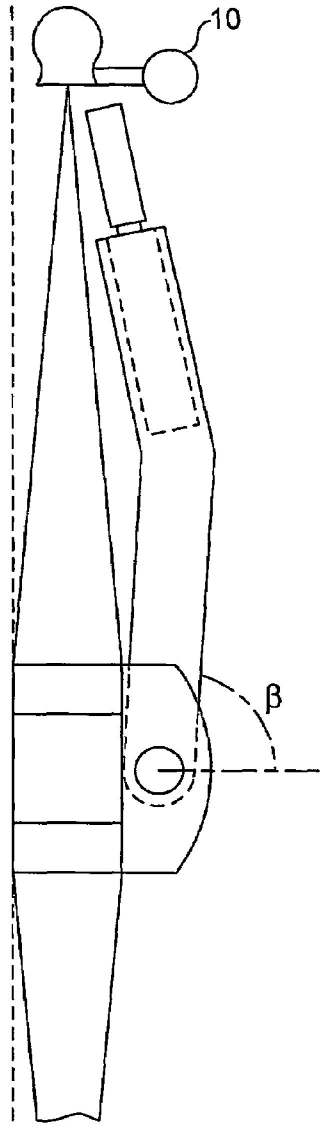
FIG. 11*b* shows a side view of the propulsion apparatus of FIG. 11*a* with the lever arm in a stored position.

In a further alternative a combination of a telescopically receivable inner member and a pivotable outer member of the lever arm is envisaged. FIG. 11A shows a configuration when arranged for use with an inner member 140*a* extending radially outwardly from the axis defined by the wheel axle and FIG. 11B shows the configuration when the inner member 140*a* is stored. In the configuration shown in FIG. 11*a* the inner member 140*a* is slidably received within an outer member 140*b*. The outer member 140*b* comprises an upper portion 140*c* and a lower portion 140*d*. The lower portion 140*b* is pivotally attached at one end to the second portion 23. Preferably the pivot biases the lower portion 140*d* to extend outwardly from the plane of the wheel at an angle α to the axis defined by the wheel axle when in use. An example of a suitable pivot is a torsion spring. At the opposite end of the lower portion 140*d* to the pivot the lower portion 140*d* merges with the upper portion 140*c* which turns through an angle to extend substantially parallel to the plane of the wheel in a direction radially outwardly from the axis defined by the wheel axle when in use. As shown in FIG. 11*a*, in use, the inner member 140*a* extends from the upper portion 140*c* so that the user can hold the handle 160 and operate the propulsion apparatus 20.

When it is desired to propel the wheelchair in the traditional manner, i.e. using the hand rim 10, it is apparent that it is necessary to store the lever arm 140 so that the hand rim 10 can be easily accessed.

Figure 12:
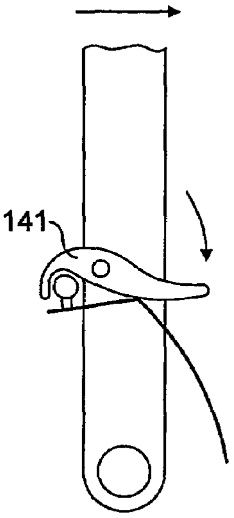
FIG. 12 shows a catch for securing the lever arm of FIGS. 11*a* and 11*b* in the stored position.

FIG. 11*b* shows a configuration where the lever arm 140 is stored so that the hand rim 10 can be accessed. The inner portion 140*a* is slid into the upper portion 140*c*, and the outer member is pivoted inwardly towards the rear wheel 8, thereby increasing the angle between axis defined by the wheel axle and the lower portion 140*d* to β (β>α). The relative lengths of the inner member 140*a*, upper portion 140*c* and lower portion 140*d* are chosen so that when the inner member 140*a* is received within the upper portion 140*c*, and the lower member 140*b* is pivoted inwardly, the length of the lever arm 140 is less than the radius of the hand rim 10. Once the lever arm 140 has been collapsed and pivoted inwardly it is secured in the "stored" position, for example using a catch hook, 141 as shown in FIG. 12, which is preferably sprung, or other suitable attachment mechanism.

Figure 16:
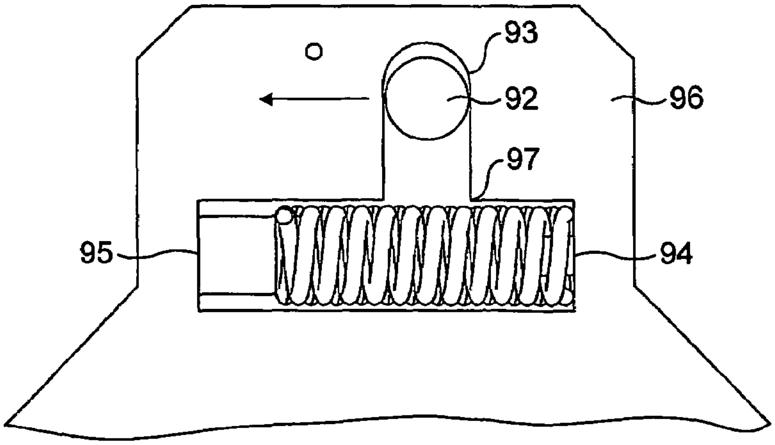
FIG. 16 shows a detailed view of a pin arrangement contained within the drive mechanism of FIG. 13.

When the propulsion apparatus 20 is provided as a two part construction, the second component 23 is attached to the hub component 22 using a quick release pin 67, which is shown in FIG. 16. It will be understood however, that other attachment mechanisms may be used, such as for example a locking nut and bolt. The quick release pin 67 comprises two ball bearings 68 mounted in the quick release pin. The ball bearings 68 are connected to a central release button 69, which is shown in FIG. 8.

In use, actuation of the central release button 69 causes the two ball bearings 68 to retract inwardly into the pin 67, whilst remaining captive. The quick release pin 67 is then inserted into the cylindrical wall 26 of the hub portion 22. When the central release button 69 is released the ball bearings 68 move radially outwardly into the configuration shown in FIG. 16 and are received in corresponding apertures or recesses (not shown) provided in the cylindrical wall 26 of the hub portion 22 thereby securing the second portion 23 to the hub portion 22.

The second component 23 comprises a drive mechanism containment portion 70, a lever arm 140 which is attached to the drive mechanism containment portion 70 and a handle 160 which is attached to the lever arm 140 at a location remote from the drive mechanism containment portion 70.

Each of the above components will now be described in further detail with reference to FIGS. 13-22.

FIG. 13 shows a drive mechanism 72 prior to assembly into the drive mechanism containment portion 70. The drive mechanism 72 comprises four jammer assemblies 74*a-d*. The jammer assemblies 74*a-d* are configured in two pairs, 74*a* and 74*b* constitute a first pair and 74*c* and 74*d* constitute a second pair. The individual jammer assemblies in each of the pairs are connected by jammer attachment plates 76*a* and 76*b*. The drive mechanism 72 further comprises a back plate 78 which is in the form of a disc. The back plate 78 comprises locator holes 80 and screw holes 82. When assembled, the locator holes 80 and screw holes 82 are aligned with locator dowels 98 and threaded holes respectively both of which are provided in the drive mechanism containment portion 70 as shown in FIG. 16. A front plate 84 is provided and the jammer attachment plates 76*a* and 76*b* are pivotally attached to the front and back plates 78 and 84 by means of respective pivot pins 86*a* and 86*b*. The front and back plates 84 and 78 further comprise respective, mutually aligned central apertures, 88 and 90, which correspond with the central axis of the drive mechanism containment portion 70.

A pin 92 and spring 94 are located in a pin housing 96, positioned between the back plate 78 and front plate 84. Also shown in FIG. 8 are brake mechanisms 180*a* and 180*b*. However, all these features will be described in more detail below.

FIG. 14 shows the drive mechanism with the front plate 84 removed for the sake of clarity. As can be seen, the jammer attachment plates 76*a* and 76*b* are interconnected by two linkage plates 77 to form a parallelogram shift mechanism 79. One of the linkage plates 77 incorporates the pin housing 96, which will be described in more detail below. The linkage plates 77 are pivotally connected at opposite ends to the jammer attachment plates 76*a* and 76*b* and are designed so as not to obstruct the central apertures 88 and 90 provided in the front and back plates 84 and 78.

Figure 15:
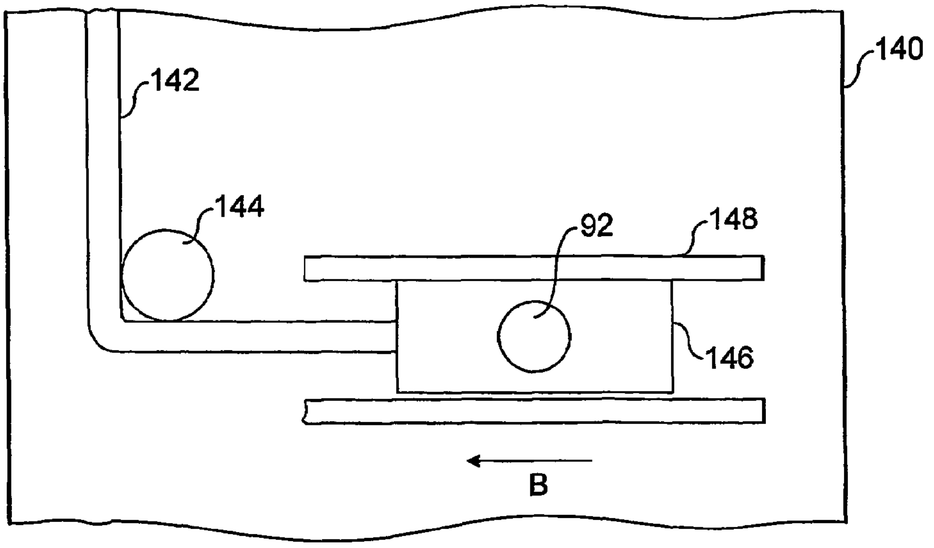
FIG. 15 shows a pin block assembly contained within a lever arm according to the present invention, with the outer casing of the arm removed for clarity.

FIG. 15 shows a mechanism for lateral movement of the pin 92. The pin 92 is connected to a pin block 146. In FIG. 15 the longitudinal axis of the pin 92 is in a direction that extends out of the page. The pin block 146 is constrained to move in a rectilinear motion substantially perpendicular to the longitudinal axis of the lever arm 140 by block guide rails 148 which are attached to the lever arm 140. The pin block 146 is attached at one end to a direction selecting cable 142. The direction selecting cable 142 extends away from the pin block 146, around a pulley 144 and then extends substantially parallel to the longitudinal axis of the lever arm 140 before being connected to the handle 160 in such a way that inward rotation of the handle will exert a pull on the cable.

FIG. 16 shows the pin housing 96 in more detail. The pin housing 96 forms part of one of the linkage plates 77 and thereby forms a part of the parallelogram shift mechanism 79. An aperture 97 is provided within the pin housing 96 and serves to locate spring 94. The spring 94 is connected at one end to a spring block 95, which in turn is attached to the lever arm 140. The aperture 97 also comprises a second portion 93 through which the pin 92 extends. Thus the action of the spring 94 is to urge an opposite end of the aperture 97 away from the spring block 95 and so bias the parallelogram shift mechanism 79 (including the jammer attachment plates 76*a* and 76*b*) in a particular direction. However, upon inward rotation of the handle 160, the cable 142 pulls pin 92 against the action of the spring 94 thereby biasing the parallelogram shift mechanism 79 in the opposite direction.

Figure 17:
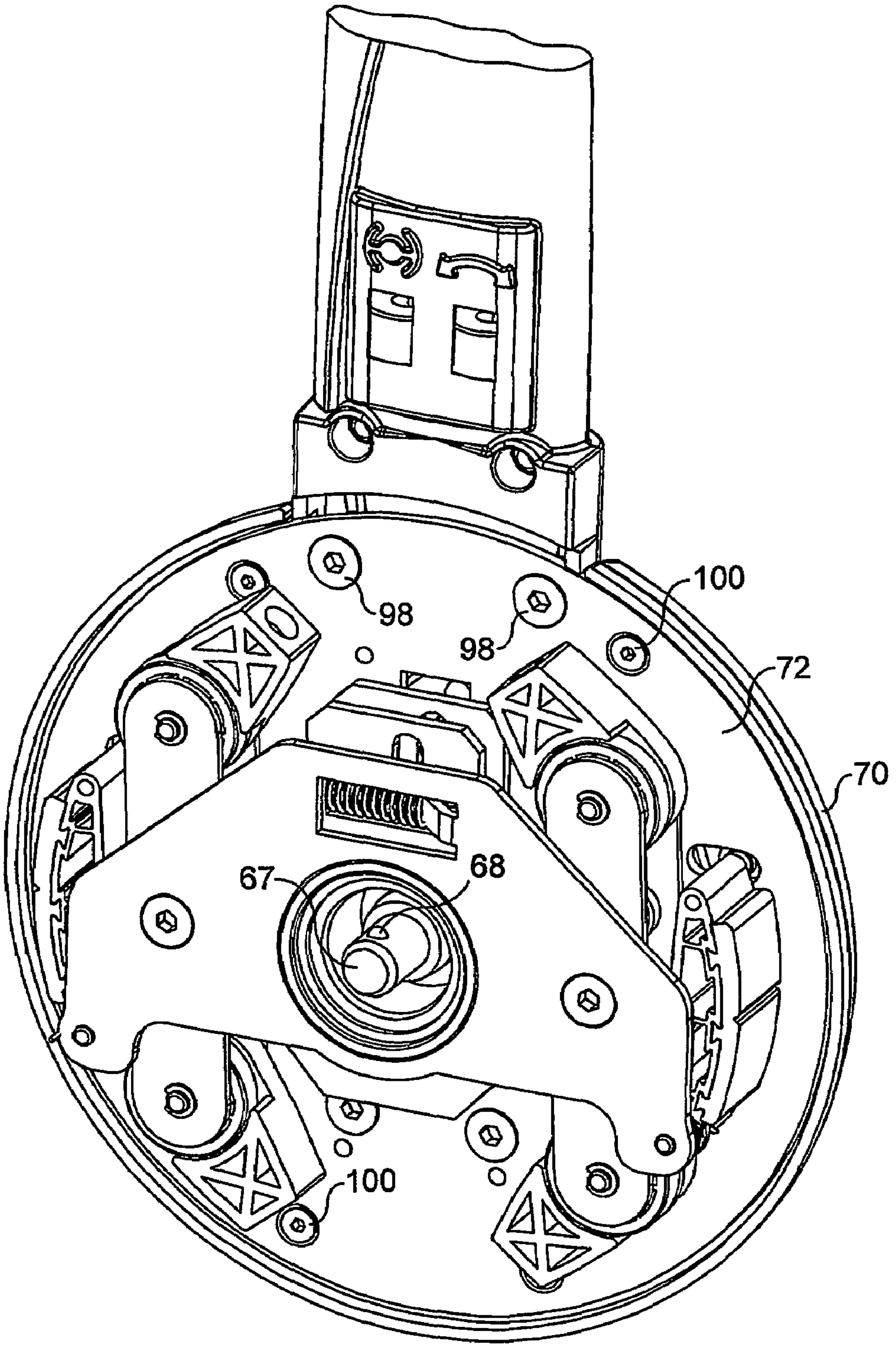
FIG. 17 shows a perspective view of the drive mechanism of FIG. 3 when inserted in the second component of the propulsion apparatus shown in FIG. 7.

FIG. 17 shows the drive mechanism 72 positioned within the drive mechanism containment portion 70. The locator dowels 98 project inwardly from an inner surface of the drive mechanism containment portion 70 and are received within the locator holes 80 in the back plate 78. At the same time the threaded screw holes provided in the drive mechanism containment portion 70 are aligned with the screw holes 82 in the back plate 78 to receive threaded screws 100.

Figure 18:
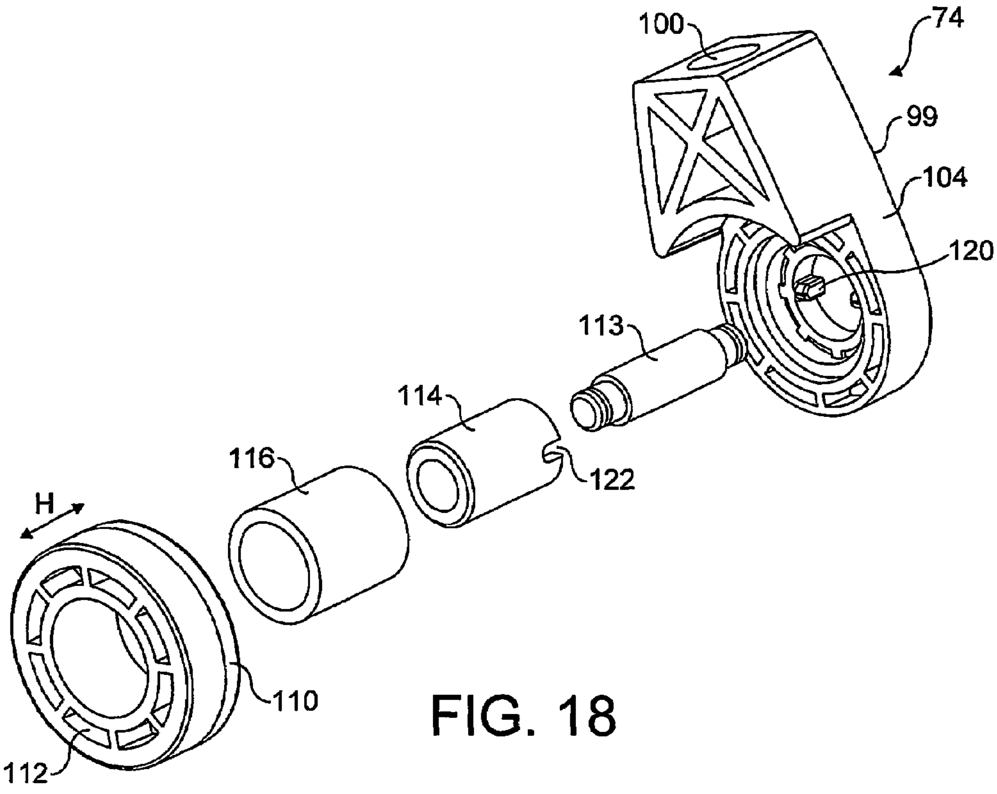
FIG. 18 shows an exploded view of a jammer assembly of the drive mechanism shown in FIG. 13.
Figure 19A:
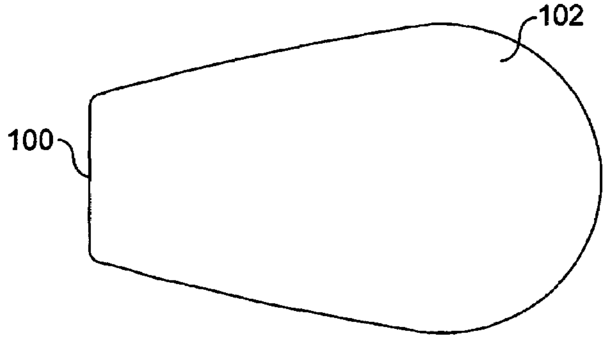
FIG. 19*a* shows a plan view of an upper surface of the jammer shown in FIG. 18.
Figure 19B:
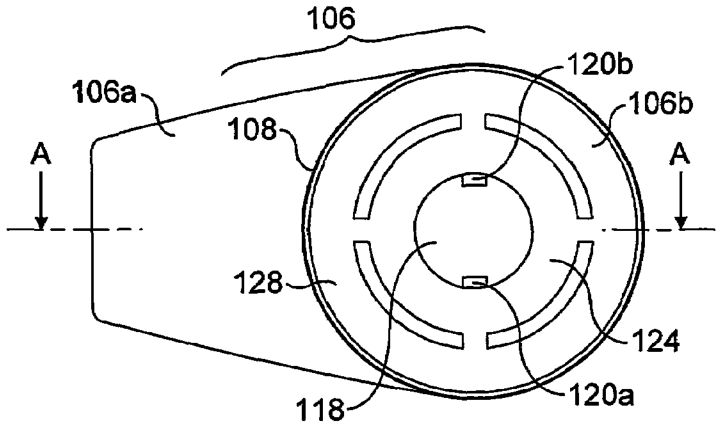
FIG. 19*b* shows a plan view of the underside of the jammer shown in FIG. 18.
Figure 19C:
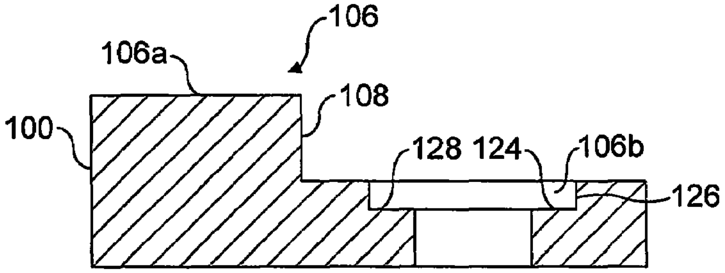
FIG. 19*c* shows a section A-A through the jammer of FIG. 19*b;*
Figure 20:
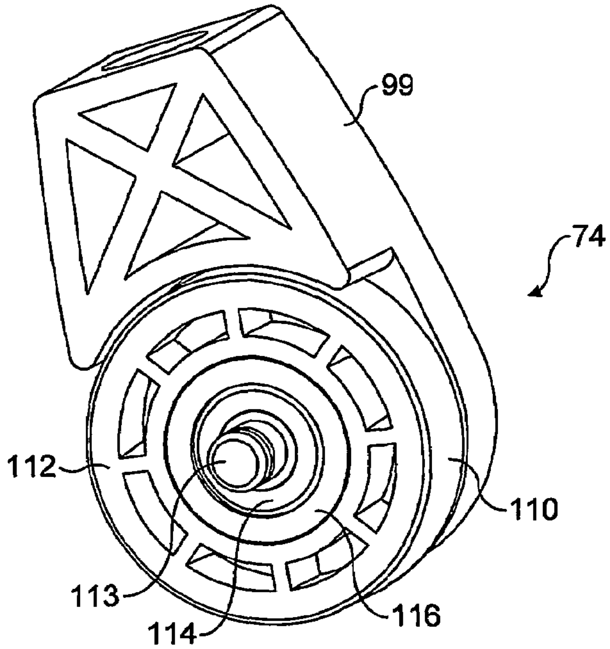
FIG. 20 shows a perspective view of the jammer assembly of FIG. 18 when assembled.

FIGS. 18, 19*a*, 19*b*, 19*c* and 20 show one jammer assembly 74 in more detail. The jammer assembly 74 comprises a jammer 99, having in side view an essentially teardrop shape. The jammer 99 comprises a substantially planar first surface 102 from which projects a curved side wall 104 which gives the jammer its distinctive teardrop shape. At one end the current side wall 104 is intersected by a substantially planar end face 100. A second jammer surface 106 opposite the first is divided into two different surface portions 106*a* and 106*b* which lie in two different planes and are interconnected by a step 108. As shown in FIGS. 18 and 19*b*, the step 108 takes an arcuate form corresponding to the outer circumference of a wheel 110. At the same time the height of the step 108, that is the distance between the first surface portion 106*a* and the second surface portion 106*b*, corresponds to the axial dimension H of the wheel 110. The jammer assembly 74 further comprises a shaft 113, a shaft sleeve 114 and a "one way" roller clutch 116. The second surface portion 106*b* comprises a through bore 118 which has two keys 120 which correspond with key slots 122 in the shaft sleeve 114. An annular part of the second surface portion 106*b* provides a location of the roller clutch and a step 126 connects the roller clutch surface 124 with a platform 128 for the wheel 110. FIG. 20 shows the jammer assembly 74 following assembly and as it is configured in the drive mechanism 72.

Figure 21A:
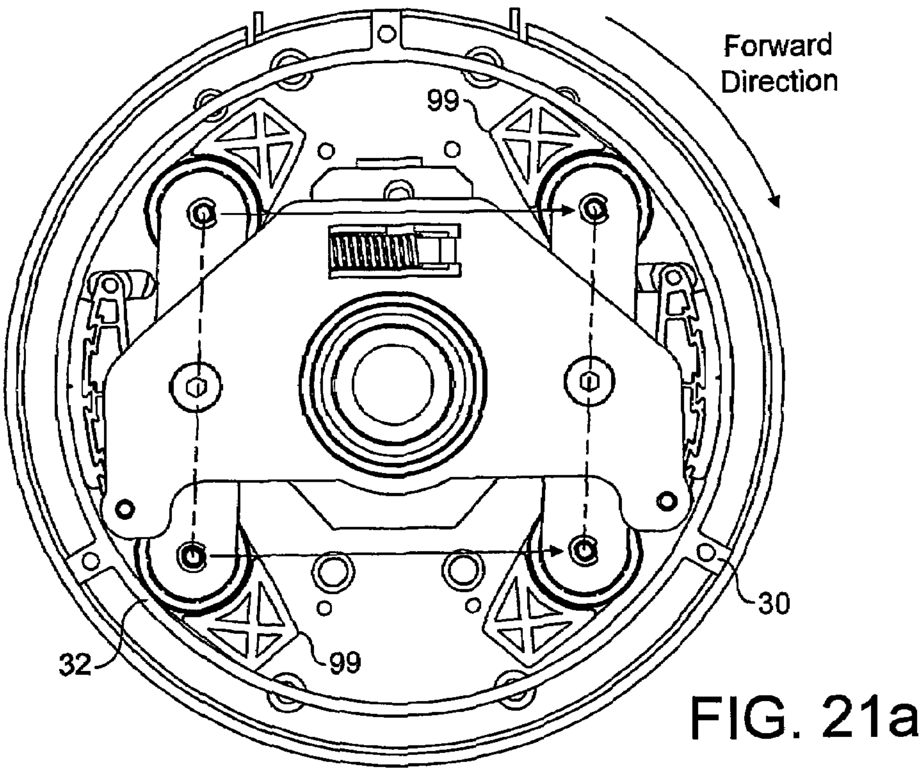
FIGS. 21*a* and 21*b* show, in more detail, the drive mechanism of FIG. 13 when attached to the hub portion of FIG. 3.
Figure 21B:
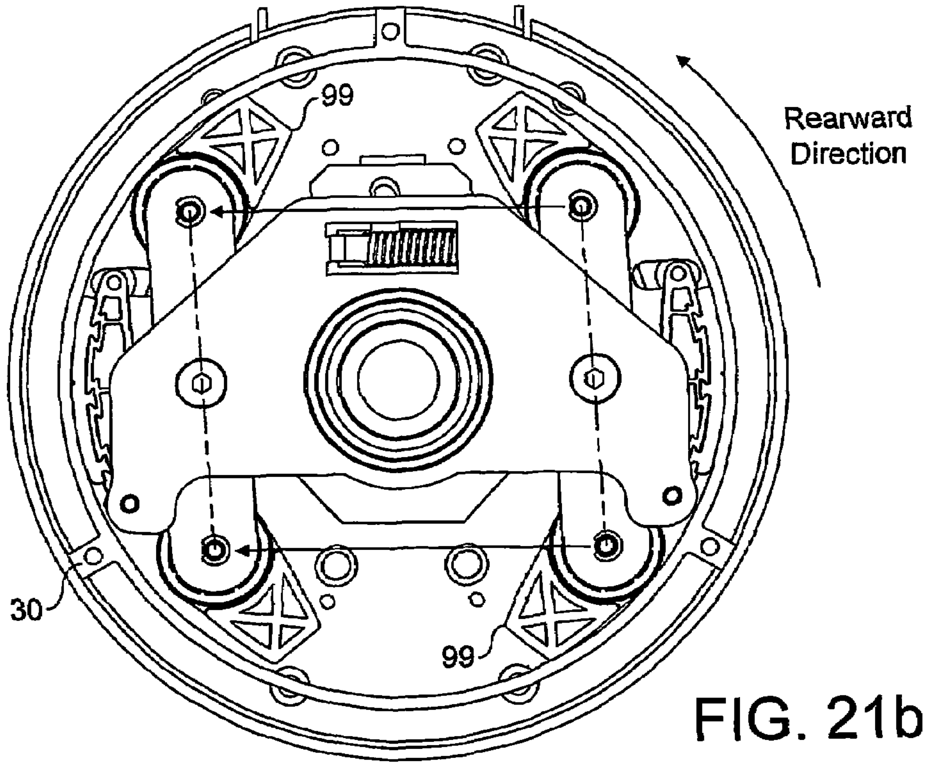

FIGS. 21*a* and 21*b* show the interaction of the drive mechanism 72 and the inner surface 32 of the hub rim 30.

The operation of the drive mechanism 72 will now be described with reference to FIGS. 21*a* and 21*b* and FIG. 22. One cycle for forward motion will be described in detail. If continuous propulsion of the wheelchair is desired in the forward direction the cycle is simply repeated.

The parallelogram shift mechanism 79 is biased for forward motion as a default as a result of the action of spring 94. As such the jammer assemblies 74*a* and 74*c* are in contact with the hub rim 30. The driving motion will be described with reference to a single jammer assembly, 74*a*, although it will be apparent that the description will apply in a similar fashion to the other contacting jammer assembly, 74*c*. The remaining two jammer assemblies 74*b* and 74*d* are not in contact with the hub rim 30 when the drive mechanism 72 is configured for forward motion.

FIGS. 22 *a-d* show the position of the lever arm 140 throughout one complete cycle. The start of the cycle is shown in FIG. 22*a*, where it can be seen that the lever arm 140 is positioned at an angle of approximately 330°, clockwise from the vertical. As the lever arm 140 is pivoted in a forward direction, as shown in FIGS. 22*b-d*, the contact between the wheel 110 and the inner surface 32 of the hub rim 30 causes the wheel 110 to rotate in the same direction as the lever arm. The rotation of the wheel 110 causes the one way roller clutch 116 to rotate in its operational direction and the clutch therefore transmits the motion to the shaft sleeve 114, which rotates in the same direction. Since the shaft sleeve 114 is keyed into the jammer 99 by the interengagement of the keys 120 and the key slots 122, the rotation of the shaft sleeve causes the jammer 99 to rotate in the same rotational direction as the wheel 110. This rotation will drive the jammer 99 into the hub rim 30 to provide a locking relationship between the jammer 99 and the hub rim 30. Further rotation of the lever arm 140 in the forward direction will result in a transfer of torque to the hub rib 30 via the jammer assembly 74. This will force the hub rim 30, and therefore the hub portion 22, to rotate in a forward direction. Since the hub portion 22 is fixed statically to an inner rim 14 of the rear wheel 8 via the trough shaped moulding 44, this rotation will in turn be transmitted to the rear wheel 8. The result is a forward rotation of the rear wheel 8 which propels the wheelchair in a forward direction.

Figure 22A:
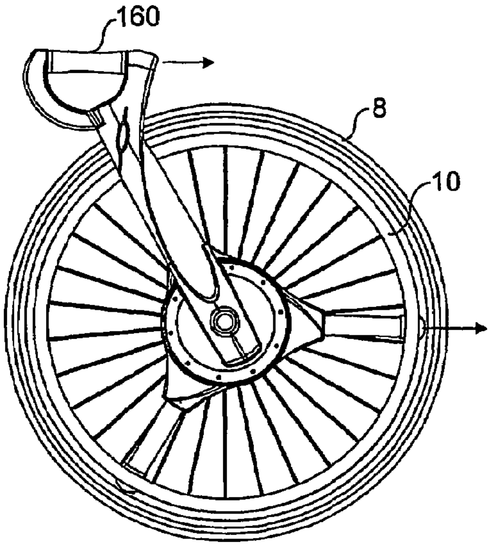
FIGS. 22*a-d* show the approximate orientation of the propulsion apparatus of FIG. 2 throughout a cycle, FIG. 22*a* depicting approximately the start of a cycle and FIG. 22*d* depicting approximately the end of a cycle.
Figure 22B:
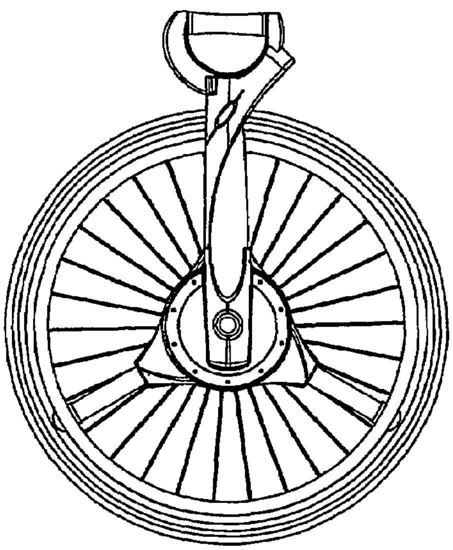
Figure 22C:
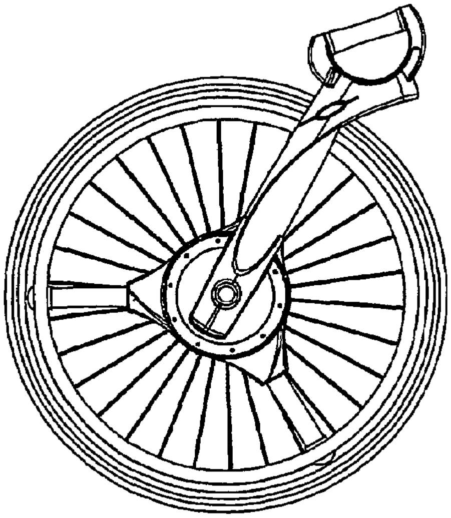
Figure 22D:
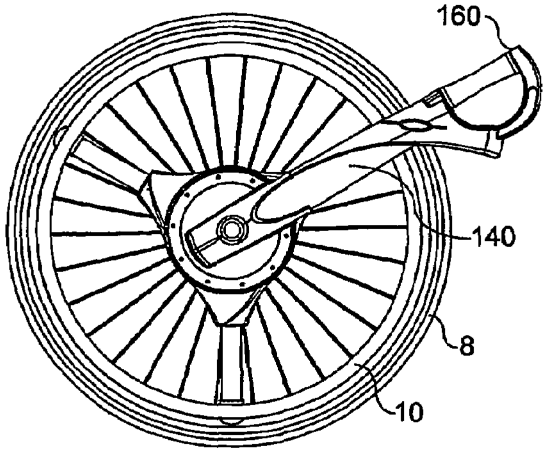

Once the end of a cycle is reached, for example at an approximate angle of 60° clockwise from the vertical as shown in FIG. 22*d*, the lever arm 140 is returned to the beginning of the cycle and the cycle repeated for continuous propulsion.

Between cycles the lever arm 140 is rotating in the opposite direction to the direction of motion. During this time the wheel 110 will also rotate in the opposite direction to the direction of motion. However, since the roller clutch 116 is only operational in one direction, in this example in the forward direction, no torque is transmitted to the jammer 99. This means that the jammer 99 will rotate away from and out of engagement with the inner surface 32 of the hub rim 30. As a result the jammer 99 provides no torque to the hub rim 30 neither does it provide any frictional resistance inhibiting further rotation. The rear wheel 8 is therefore able to continue to rotate in a forward direction, in a so-called "freewheel" motion.

Should it be desired to rotate the rear wheel 8 in a reverse direction the direction selecting cable 142 is activated by rotating the handle 160 inwardly. The cable 142 pulls the pin block 146 causing it to move. The pin block 146 will slide, since it is constrained by the block guide rails 148, in a direction as depicted by the arrow B in FIG. 15, Referring now to FIG. 16 it will be apparent that the movement of the pin 92 in the direction shown by the arrow B causes the spring 94 to compress against the spring block 95. This in turn causes the parallelogram shift mechanism 79 to move in the direction of the arrow C. This releases the jammer assemblies 74*a* and 74*c* from their contact with the inner surface 32 of the hub rim 30 and instead brings the jammer assemblies 74*b* and 74*d* into engagement with the inner surface 32. Rotational movement of the lever arm 140 in a rearward direction will then force the jammers 99 of these assemblies into contact with the inner rim 32, resulting in a rearward rotation of the wheel 8 by the same mechanism as previously described.

In an alternative embodiment of the present invention, a contact wheel may replace the jammer assembly 74. Preferably, the contact wheel may be made of a high friction material to provide enhanced frictional contact with the hub rim 30. Advantageously, the contact wheel may also be made of a material capable of deformation to provide an increased contact surface with the hub rim 30. In this embodiment only one contact wheel will be required for both forward and rearward rotation of the rear wheel 8, although it will be understood that more than one contact wheel may be provided if desired. In order to provide forward rotation the contact wheel contacts the hub rim 30 and the lever arm 140 is pivoted in a forward direction. The contact wheel will therefore rotate in a forward direction, thereby transmitting torque to the hub rim 30 and the rear wheel 8. The handle 160 is then be rotated inwardly to disengage the contact wheel from the hub rim 30 allowing the rear wheel 8 to freewheel whilst the lever arm 140 is returned to the start of the motion. The handle 160 is then rotated outwardly again and the contact wheel reengages the hub rim 30. For continuous forward motion this cycle is repeated. For rearward motion, the handle is rotated inwardly and the lever arm 140 moved to the end of the motion while the contact wheel is disengaged from the hub rim 30. The handle 160 is then rotated outwardly again and the contact wheel is brought into engagement with the hub rim 130. The lever arm 140 is then pivoted in a rearward direction and, as with the description of forward motion, torque is transmitted to provide rearward rotation of the rear wheel 8.

It will be understood that the described drive mechanisms, i.e. the jammers and contact wheels, are examples only and that other mechanisms for transferring torque in a forward or rearward direction whilst being capable of allowing freewheeling, such as the use of clutches, is also envisaged.

In a further alternative embodiment of the present invention, a two stage inward rotation of the handle 160 provides first a neutral stage, in which the none of the jammer assemblies 74*a-d* are in engagement with the hub rim 30, and a second reverse stage, in which jammer assemblies 74*b* and 74*d* engage the hub rim 30. In such an embodiment the jammer assemblies 74 may once again take the form a contact wheel. As before, the contact wheel may preferably be made of a high friction material to provide enhanced frictional contact with the hub rim 30. Advantageously, the contact wheel may also be made of a material capable of deformation to provide an increased contact surface with the hub rim 30. Advantageously, more than one contact wheel may be arranged in a parallelogram shift mechanism 79 as previously described, providing at least one contact wheel for forward motion and at least one contact wheel for rearward motion. Although the torque transmission will be similar to that described in previous embodiments, the freewheeling motion will be provided by inwardly rotating the handle 160 to put the drive mechanism 72 into the first neutral stage, in which none of the contact wheels are in contact with the hub rim 30.

Although the drive mechanism containment portion 70 is described as being a part of the second portion 23, it will also be understood that the drive mechanism 72 may be contained within the hub portion 22 and activated when the second portion 23 is attached.

Figure 23:
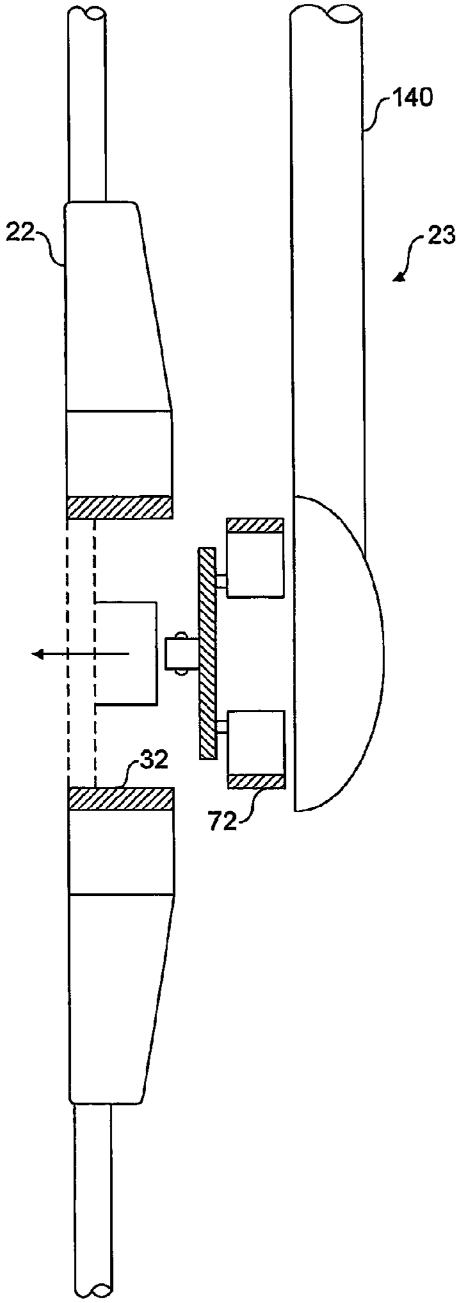
FIG. 23 shows an exploded side view of a propulsion apparatus according to the present invention.

In summary, FIG. 23 shows a hub portion 22 and a second portion 23 which comprises a lever arm 140. The second portion 23 further comprises a drive mechanism 72 and the hub portion 22 has a hub rim 30 with an inner surface 32. The interaction between the drive mechanism 72 and the inner surface 32 provides the driving connection by which the torque is transmitted from the second portion 23 to the rear wheel 8.

Figure 24:
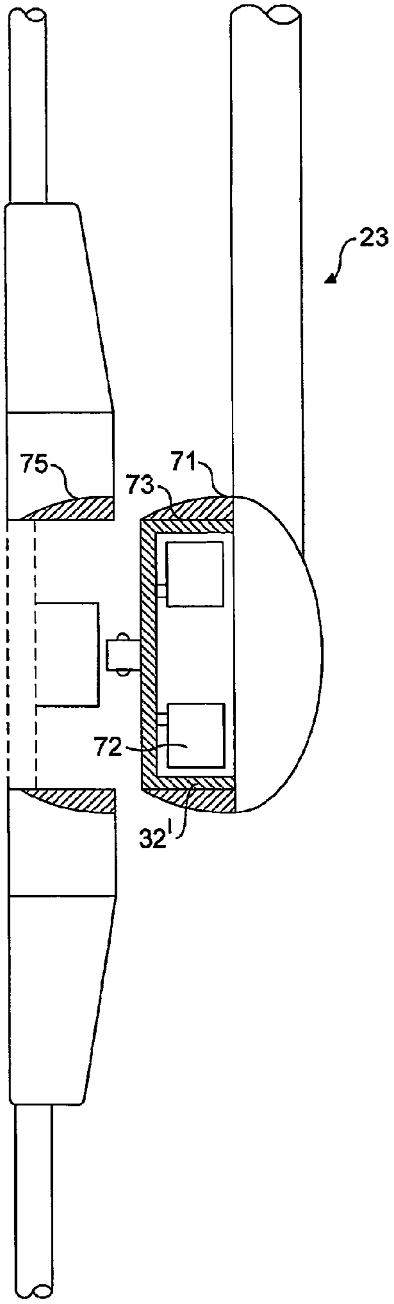
FIG. 24 shows an exploded side view of a propulsion apparatus according to an alternative embodiment of the present invention.

FIG. 24 shows an alternative embodiment in which the second portion 23 comprises both the drive mechanism 72 and an annular surface 32'. The drive mechanism 72 interacts with the annular surface 32' to transmit torque. In this alternative embodiment the second portion 23 is statically attached to the hub portion 22, for example by the use of splines 71 being provided on an exterior surface 73 of the annular surface 32' which are inserted into corresponding grooves 75 in the hub portion 22. It will also be understood that other methods of keying the second portion 23 to the hub portion 22 are also acceptable.

An advantage of housing the drive mechanism 72 within a drive mechanism containment portion 70 of the second portion 23 is that, when the second portion 23 is removed from the hub portion 22 the drive mechanism 72 is also removed. This means that the weight of both the second portion 23 and the drive mechanism 72 are removed. Therefore, if the wheelchair user wishes to propel the wheelchair in the traditional manner, having removed the second portion 23, they will not have to contend with the extra weight of the drive mechanism 72. Furthermore, if the second portion 23 also comprises the annular rim 32', when the second portion 23 is removed, for example for propulsion of the wheelchair in the traditional manner, the weight of the propulsion apparatus 20 retained in/on the rear wheel 8 will be further reduced.

A further advantage of housing both the drive mechanism 72 and annular rim 32' in the second portion 23 is that when the second portion 23 is removed neither of the drive surfaces are exposed, meaning that the possibility of dirt ingress, which could effect their performance, is minimized.

A yet further advantage of having a detachable second portion 23 is that when the second portion 23 is removed the width of the wheelchair will be reduced. This will be useful when negotiating narrow gaps, such as doorways.

In a yet further embodiment both the annular surface 32 and a drive mechanism 72' may be contained within the hub portion 22. In this embodiment the second portion 23 is statically attached to the drive mechanism 72', to activate the interaction of the drive mechanism 72' and annular surface 32 to transmit torque.

An advantage of retaining the drive mechanism 72' within the hub portion 22 is that when the second portion 23 is removed, for example to reduce the width of the wheelchair for negotiating narrow gaps, it will not include the weight of the drive mechanism 72'. This means that the second portion 23 can be more easily manoeuvred by the wheelchair user.

One method for varying the drive ratio of propulsion speed of the vehicle to power input by the user is to use gearing systems. An alternative method is to use a variable length lever arm, and this alternative will now be described in more detail.

As has been previously discussed, the lever arm 140 may be collapsible by telescopically receiving an inner member inside an outer member to reduce the length of the lever arm 140. This system can also be adapted so that the lever arm 140 can have a variable radial length, the working length, (rather than just "in use" and "stored" lengths), for example by the provision of a plurality of apertures at varying distances along the outer member for engagement with ball bearings on the inner member. The working length being the distance between the point at which the user applies an input force and the axle of the wheel.

Figure 25A:
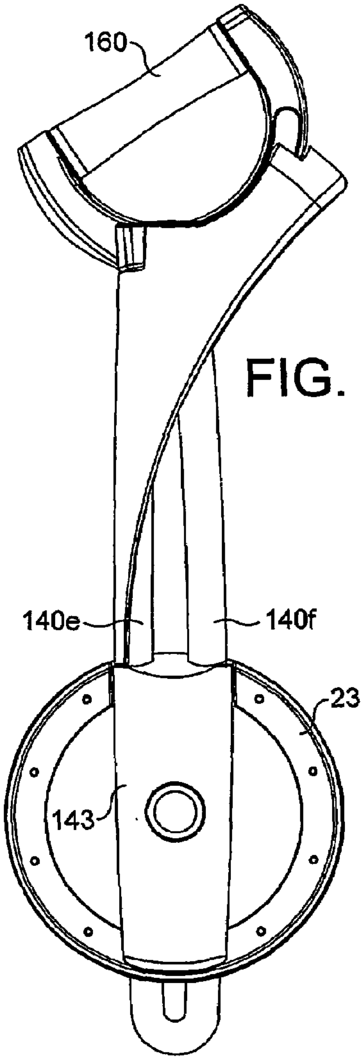
FIG. 25*a* shows a front view of a lever arm portion according to the present invention having an alterable length.
Figure 25B:
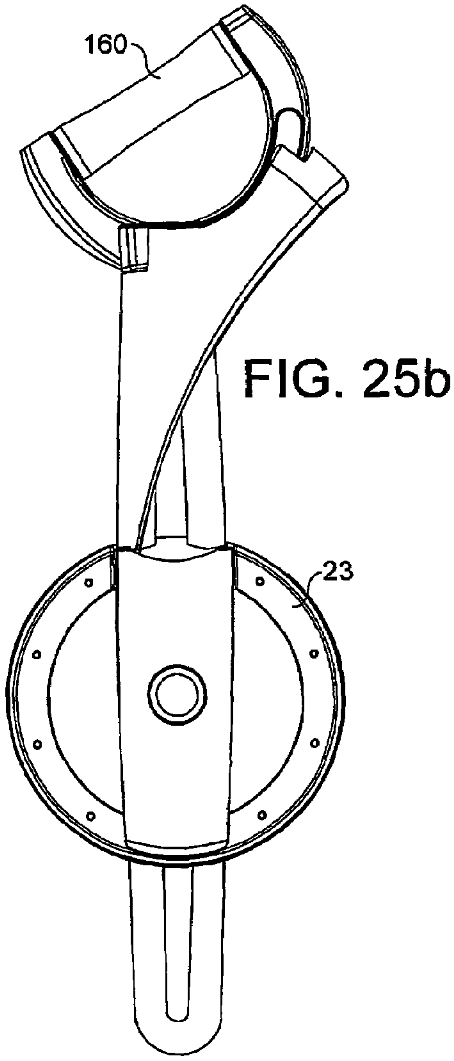
FIG. 25*b* shows the lever arm portion of FIG. 25*a* with an altered length.

FIGS. 25*a* and *b* show a further example of how the lever arm 140 may be varied in length. In this example the lever arm 140 is comprised of first and second tubular members 140*e* and 140*f* which are preferably joined at an end remote from the handle 160. The first and second tubular member 140*e* and 140*f* are slidably received in corresponding cylindrical bores (not shown) which pass through a housing portion 143 on the second portion 23.

Figure 26:
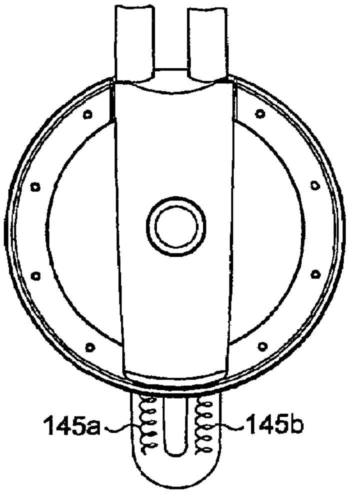
FIG. 26 shows a detailed view of the lever arm portion of FIGS. 25*a* and 25*b;*

In one embodiment, as shown in FIG. 26, the configuration further includes springs 145*a* and 145*b* to aid in the control of the sliding of the first and second tubular members 140*e* and 140*f* within the cylindrical bores.

Figure 27A:
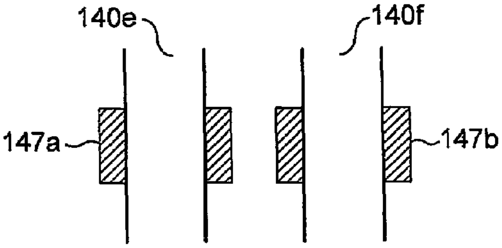
FIG. 27*a* shows a detailed view of the internal working of the lever arm portion of FIGS. 25*a* and 25*b* in a clamped position.
Figure 27B:
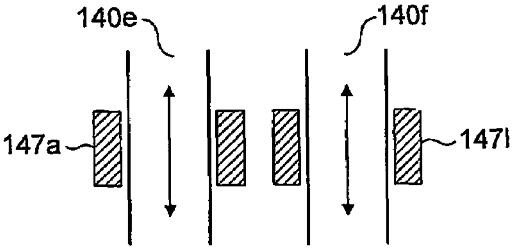
FIG. 27*b* shows a detailed view of the internal working of the lever arm portion of FIGS. 25*a* and 25*b* in an operable position.

The first and second tubular members 140*e* and 140*f* may be held in a desired position within the cylindrical bores by means of clamps 147*a* and 147*b* as shown in FIG. 27A. When it is desired to alter the length of the lever arm 140 the clamps 147*a* and 147*b* are released, as shown in FIG. 27B, so that the first and second tubular members 140*a* and 140*f* are free to slide. Once the desired length is achieved then the clamps 147*a* and 147*b* are activated to clamp the tubular members 140*e* and 140*f* so that the lever arm 140 is prevented from sliding.

One method of activating and releasing the clamps 147*a* and 147*b* is to attach them to a cable (not shown) which is activated by movement of the handle 160, or a lever attached thereto. However, it will be appreciated that other mechanisms for holding the lever arm 140 at a desired length and of releasing it for sliding movement may also be used.

The use of a lever arm with a variable working length enables the user to vary the drive speed and load effort without the use of a gearing mechanism. If the user shortens the length of the lever arm 140 and maintains a constant speed of reciprocation of the lever arm, then the speed of rotation of the rear wheel 8 will increase. However, the input force required by the user will increase. Conversely, if the user increases the length of the lever arm 140 and maintains a constant speed of reciprocation, then the speed of rotation of the rear wheel 8 will decrease, as will the required input force exerted by the user. It is therefore apparent that the use of a variable length lever arm enables the drive ratio of propulsion speed/input force to be altered without the use of complex gearing systems. The handle 160 will now be described with reference to FIGS. 19*a*, 19*b*, 20 and 21.

Figure 28A:
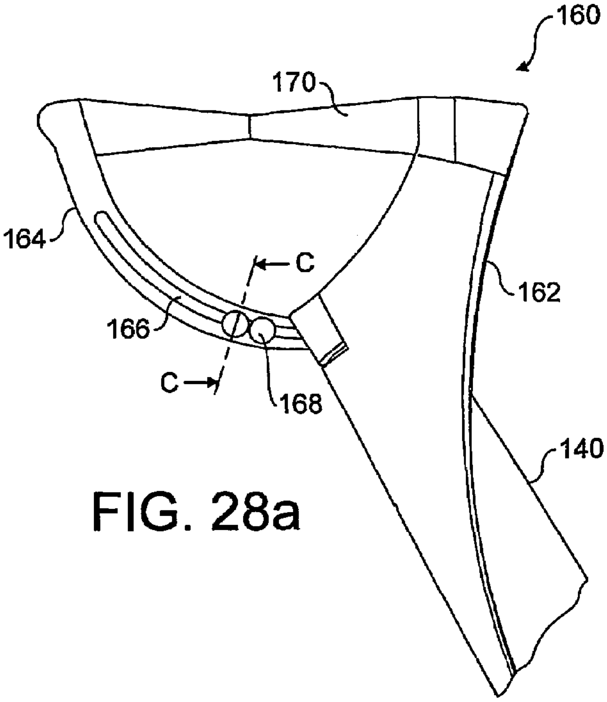
FIG. 28*a* shows a detailed side view of a handle of the propulsion apparatus of FIG. 2 at approximately the start of a cycle.
Figure 28B:
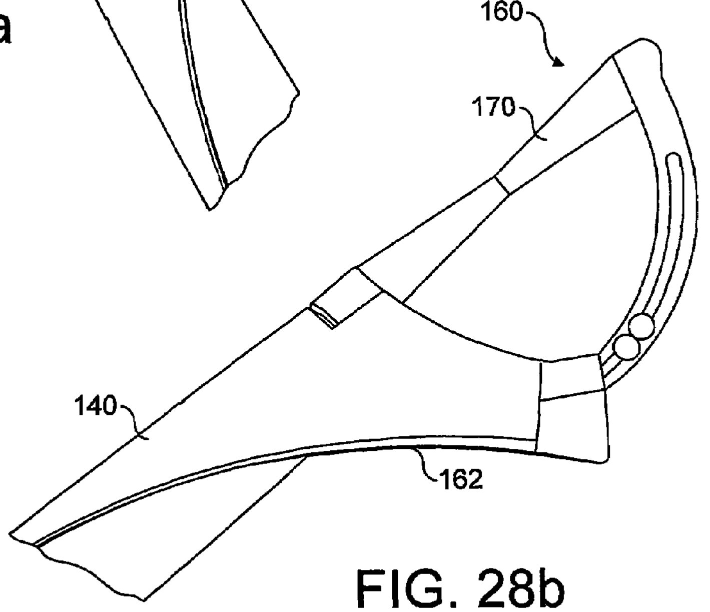
FIG. 28*b* shows a detailed side view of the handle of the propulsion apparatus of FIG. 2 at approximately the end of a cycle.
Figure 29:
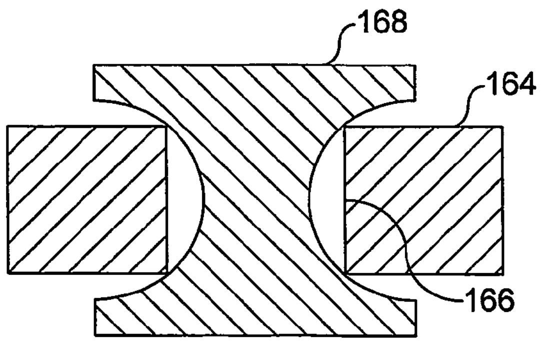
FIG. 29 shows a section C-C through a Cantilever Roller as shown in FIG. 28*a;*

FIG. 28*a* shows the handle 160 at the start of a cycle, i.e. in the position shown in FIG. 27*a*, while FIG. 28*b* shows the handle 160 at the end of a cycle, i.e. in the position shown in FIG. 27*d*. The handle 160 is attached to the lever arm 140 and comprises a handle housing 162 which is shown as being formed integrally with the lever arm. However, it will be appreciated that the handle housing 162 may be formed separately and only later attached to the lever arm 140 if desired. The handle 160 further comprises a semi-circular annular ring 164. A slot 166 extends through a minor arc of the semi-annular ring 164 and serves to locate a number of cantilever rollers 168. A section through one of the rollers 168 is shown in FIG. 28 to illustrate how the roller is located within the semi-annular ring 164. The handle 160 further comprises a hand piece 170 which is connected to opposite ends of the semi-annular ring 164 and is shown to have an ergonomically designed taper from the ends of the hand piece towards the centre. However, it will be appreciated that the hand piece may take other forms, and may for example in some embodiments comprise a straight cylindrical bar.

Figure 30:
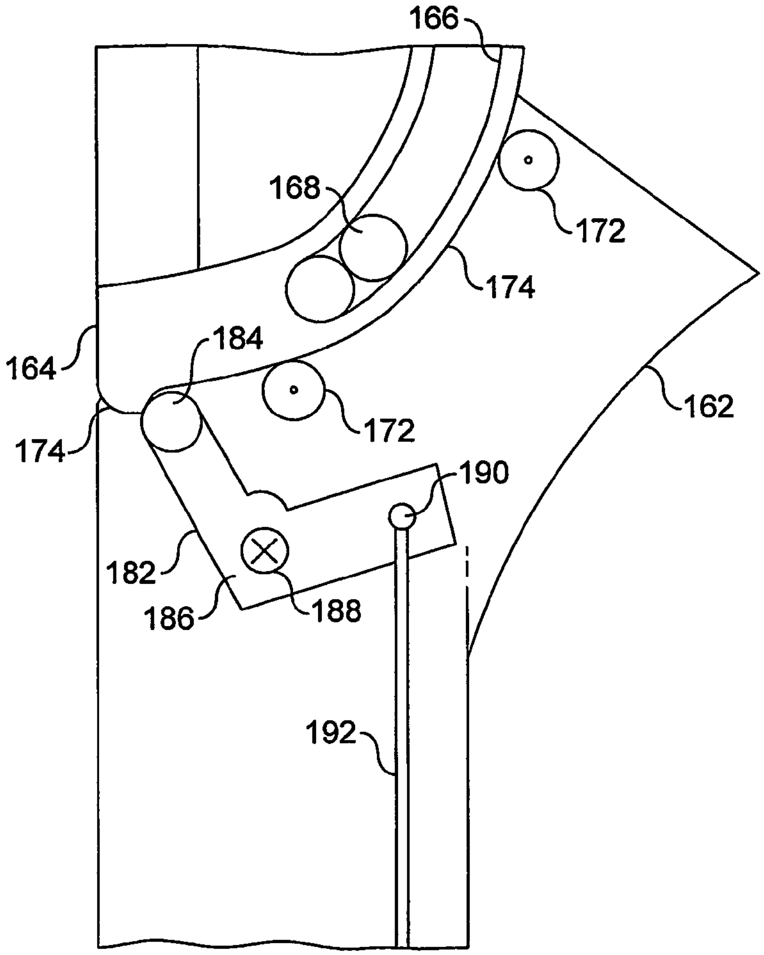
FIG. 30 shows a section through the handle of FIGS. 28*a* and 28*b*, with the handle in a fully extended position.

FIG. 30 shows a section through the handle 160 and handle housing 162. As can be seen the semi-annular ring 164 is supported by two rollers 172, which are secured to the handle housing 162. The rollers 172 are positioned so as to maintain contact with an outer surface 174 of the semi-annular ring 164 throughout the travel of the handle 160.

During one cycle the handle 160 will rotate through the handle housing 162 as shown in FIGS. 21*a-d*. The motion of the handle 160 provides an ergonomic hand movement which will be described further with reference to FIGS. 28*a*, 28*b* and 30.

As the lever arm 140 is pivoted in a forward direction the user maintains a grip on the hand piece 170 and the semi-annular ring 164 moves through the handle housing 162 supported by the rollers 172 until it reaches the configuration shown in FIG. 28*b*. The range of motion is limited by a stop, not shown, which is provided within the handle housing 162 to limit the travel of the semi-annular ring 164. At the end of one cycle the user returns the lever arm 140 to the start of the cycle and the handle will smoothly return to the position shown in FIG. 28*a*.

The handle 160 further comprises a mechanism for applying a braking force against the motion of the wheelchair. FIG. 30 shows a brake actuation mechanism 182 provided in the handle 160. The semi-annular ring 164 is provided with a profile 174 at an end which comes into contact with the lever arm 140. The lever arm 140 comprises a brake roller 184 mounted to a pivot lever 186. The pivot lever 186 pivots about a pivot pin 188. The pivot lever 186 is shown as being substantially "L" shaped. However, it will be apparent that other shapes may be used. At an end of the pivot lever 186 remote from the brake roller 184 and on the opposite side of the pivot pin 188 an attachment point 190 is provided for securely attaching a brake cable 192 which runs through the lever arm 140 and is connected to a brake control mechanism 194 housed in the drive mechanism containment portion 70.

Figure 31:
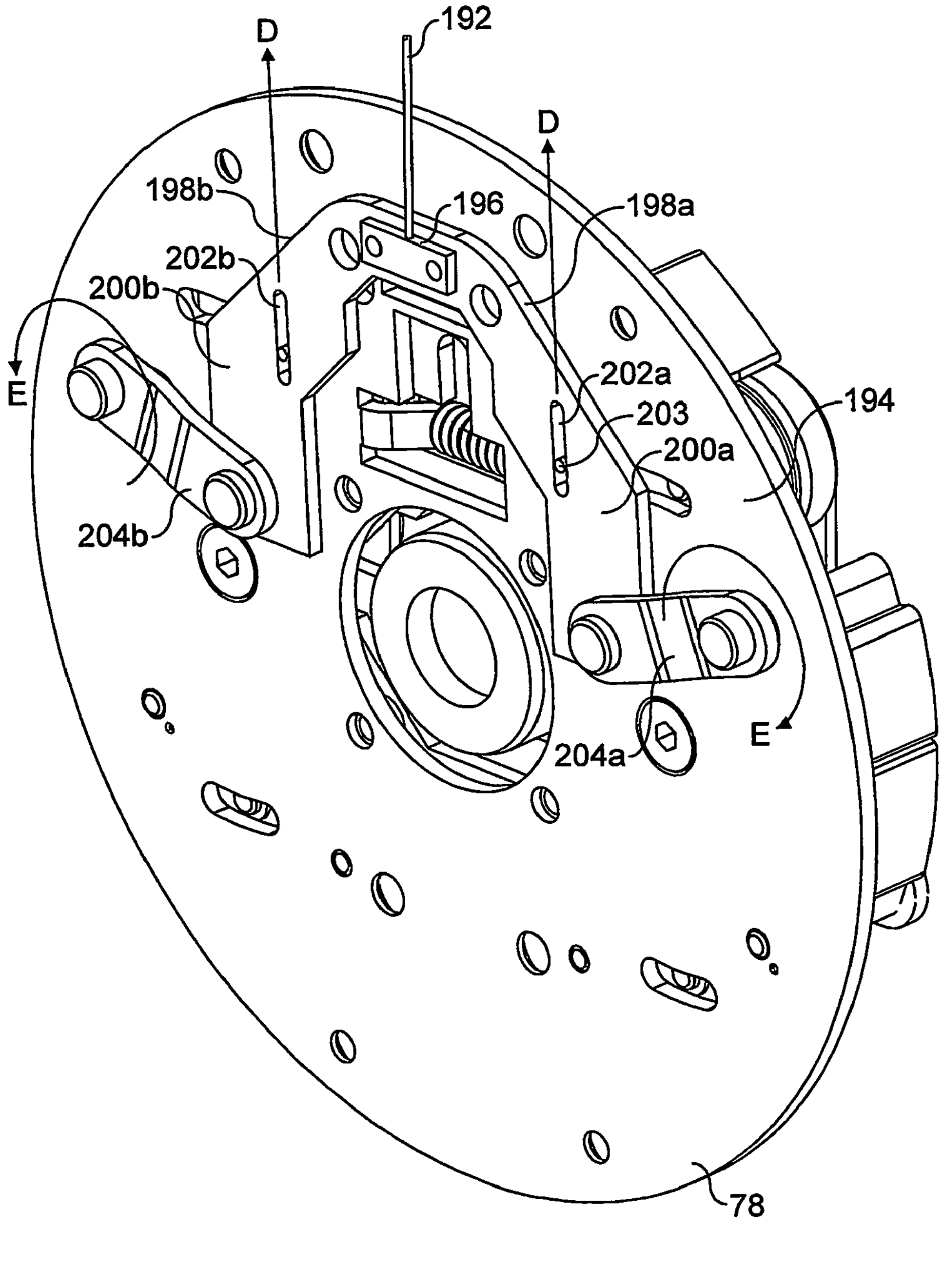
FIG. 31 shows a perspective rear view of the drive mechanism of FIG. 9.

FIG. 31 shows the rear side of the back plate 78 of the drive mechanism 72 and illustrates the brake control mechanism 194 in more detail. The brake control mechanism 194 is attached to the rear side of the back plate 78 and comprises a horizontal plate 196 connected to the brake cable 192 and the back plate 78. The horizontal plate 196 merges at opposite ends with downwardly and outwardly depending plates 198*a* and 198*b* which in turn merge with substantially vertically downwardly depending plates 200*a* and 200*b*. The downwardly and outwardly depending plates 198*a* and 198*b* each comprise a respective vertical slot 202*a* and 202*b* in which is received a respective pin 203 which extend rearwardly from the back plate 78. The vertical plates 200*a* and 200*b* are attached to respective brake arms 204*a* and 204*b*. Brake shoe attachments 206*a* and 206*b* are provided at an end of the brake arms 204*a* and 204*b* remote from the vertical plates 200*a* and 200*b*.

Looking now at FIG. 13, it can be seen that a brake slot 208 is provided in the back plate 78 of the drive mechanism 72. The brake shoe attachments 206*a* and 206*b* extend through the brake slot 208 to attach the brake arms 204*a* and 204*b* to brake shoes 210*a* and 210*b*.

Although in what follows only one of the brake mechanisms 180 will be described, nevertheless it will be apparent that the description will equally apply to the other, opposing brake mechanism.

The brake shoe 210 comprises an inner shoe plate 212, which is disposed substantially perpendicularly to the back plate 78 of the drive mechanism 72. The inner shoe plate merges at either end with opposite ends of a curved plate section 214. A brake pad 216 is fixed to the curved plate section 214 by means of interlocking keys 218 and key slots 220.

Figure 32A:
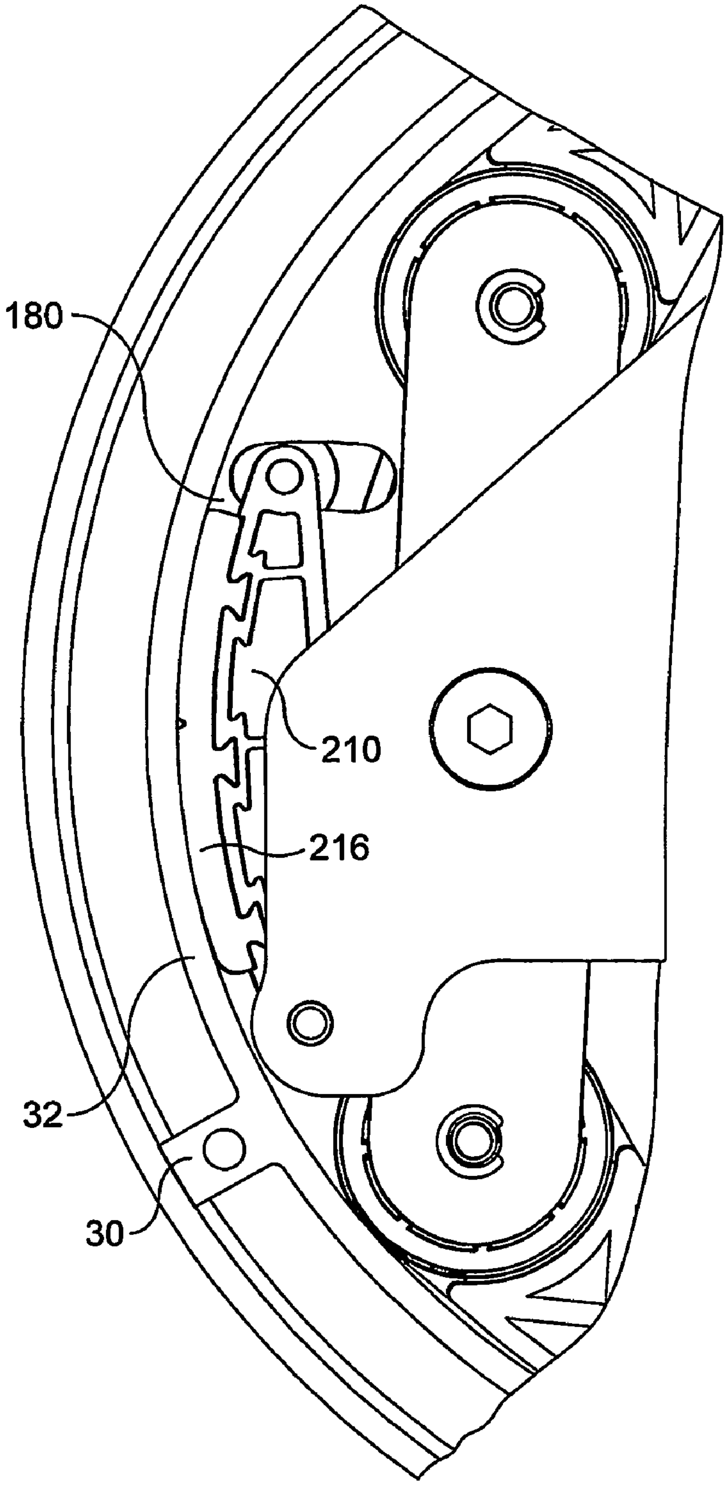
FIGS. 32*a* and 32*b* show a braking mechanism according to the present invention.
Figure 32B:
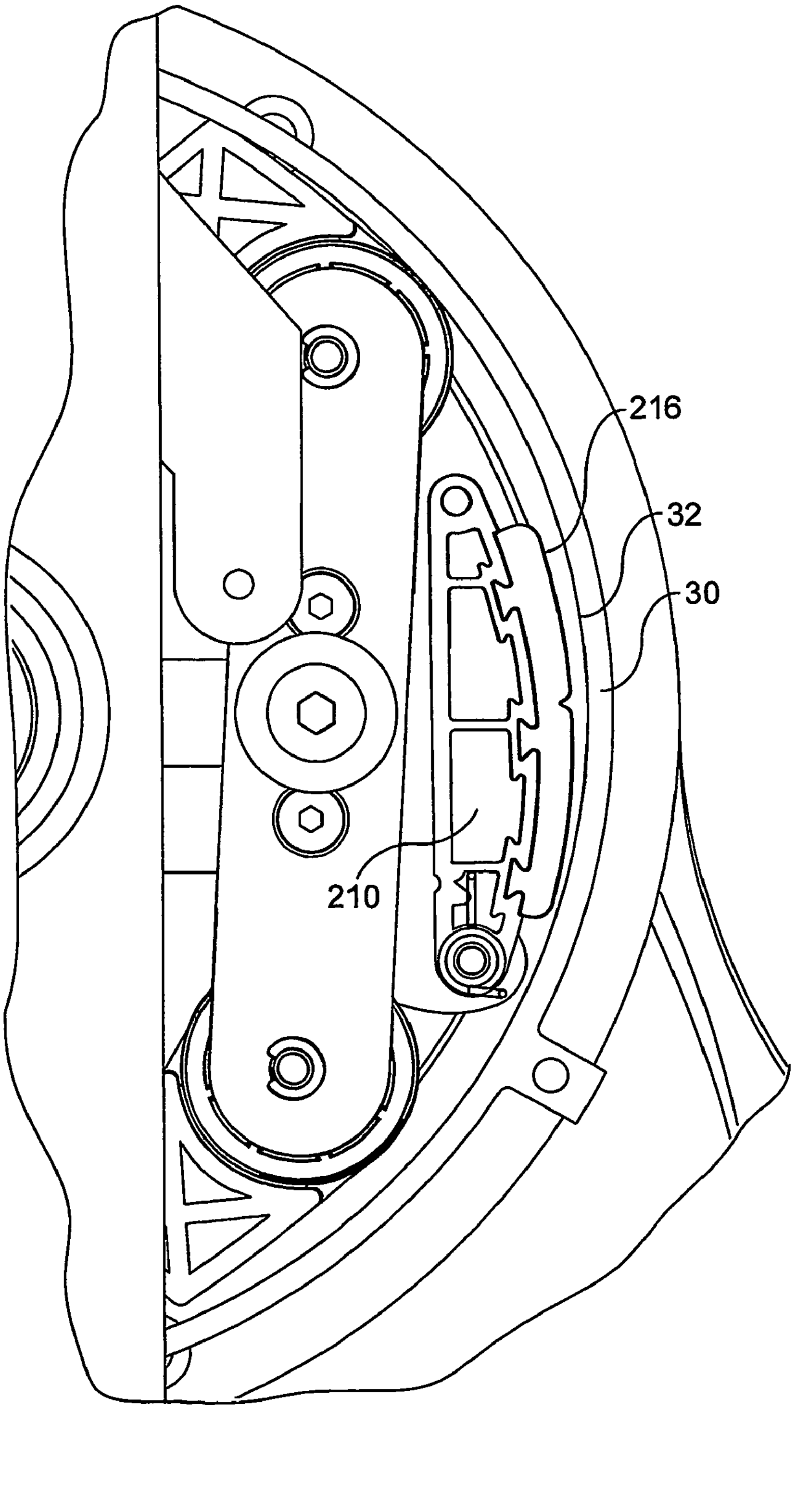

The braking process will now be described with reference to FIGS. 30, 32*a* and 32*b*. The handle 160 is rotated such that the cam profile 174 provided in the handle 160 contacts the brake roller 184 thereby causing the pivot lever 186 to pivot about the pivot pin 188. As the pivot lever 186 pivots the attachment point 190 moves in a direction away from the drive mechanism 72. Since the brake cable 192 is attached to the attachment point 190, the brake cable is also moved in a direction away from the drive mechanism 72. The arrows D in FIG. 31 show how, as the brake cable 192 moves, the horizontal plate 196 and the attached plates 198 and 200 move. This movement is constrained to be in a direction parallel to that of the brake cable 192 by virtue of the receipt of the pins 203 in the slots 202*a* and 202*b*. The movement of the vertical plate 200 is transmitted to the brake arms 204*a* and 204*b*. However, since the brake shoe attachment 206*a* and 206*b* are restrained within the brake slot 208 the motion is converted to one urging the brake shoes 210*a* and 210*b* in a radially outward direction as shown by arrows E in FIG. 30. The result of this movement is that the brake pads 216 are forced into contact with the inner surface 32 of the hub rim 30. The friction provided between the brake pads 216 and hub rim 30 acts to slow the motion of the hub rim and therefore the rear wheel 8. If the contact between the brake pads 216 and hub rim 30 is maintained the frictional contact will slow the movement of the wheelchair, eventually bringing it to a stop.

Once the handle 160 is released, thereby releasing the contact between the cam profile 174 and the brake roller 184, the brake cable 192 will also be released. The mechanism will then be reversed such that the brake pad 216 is released from contact with the hub rim 30 and motion of the rear wheel 8 may be resumed.

Although a manual wheelchair has been described, it will be understood that this invention is equally applicable to a hybrid wheelchair, i.e. a wheelchair that also has the capability of motorised propulsion.

Alternative ways of transmitting torque to the hub portion 22 may also be used. Thus the frictional system described above could be replaced by one based on positive engagement. For example, the hub rim 30 could take a toothed form and the driving mechanism could be provided by intermeshing teeth. Thus the hub rim 30 could comprise an annular rack and the driving mechanism one or more interengaging gear wheels.

Additionally, other methods of braking may be used. For example, in an alternative embodiment a brake lever may be provided whereby a friction pad is provided on an inner side of the lever arm. The lever arm 140 may be hinged at the end where it is attached to the drive mechanism containment portion enabling the arm to be inclined towards the wheel. In this embodiment the lever arm may be pulled inward to bring the friction pad into contact with either the hand rim or the wheel to slow down rotation of the wheel. Alternatively, the inward motion of the lever arm 140 may engage a pair of drum style rotary brakes.

Although the present invention is described as being for use with a wheelchair, it will be understood that it is equally applicable to other manually propelled vehicles, for example trolleys, which would benefit from an enhanced propulsion mechanism.

The invention claimed is:

1. A propulsion apparatus mountable to a vehicle, the vehicle comprising at least one ground engaging wheel having an axis of rotation and the propulsion apparatus comprising;

a hub portion adapted to be statically attached at a location remote from said axis to at least one of a rim of said wheel and a structural member projecting from a plane defined by said wheel, the structural member being rigidly attached to the wheel;

a lever arm pivotal about an axis coincident with said rotational axis of said wheel; and a drive mechanism interposed between said hub portion and lever arm such that pivotal movement of said lever arm about said axis causes said hub portion to rotate thereby propelling the vehicle;

wherein said hub portion carries means for location of said lever arm such that the axis of rotation of the lever arm is coincident with the axis of the wheel.

2. A propulsion apparatus as claimed in claim 1, wherein either said hub portion or said lever arm has a continuous contact surface and said drive mechanism is carried by either the hub portion or the lever arm, said drive mechanism being selectively engageable with said continuous contact surface such that, when engaged, pivotal movement of the lever arm about said axis causes said hub portion to rotate thereby propelling the vehicle.

3. A propulsion apparatus as claimed in claim 2, wherein the drive mechanism comprises rolling support means adapted to frictionally engage the continuous contact surface.

4. A propulsion apparatus as claimed in claim 3, wherein, when the lever arm is pivoted about said axis in a first direction, the rolling support means is selectable to frictionally engage the continuous contact surface to cause the rotation of the hub portion in one sense and, when the lever arm is pivoted about said axis in a second direction, opposite to said first direction, the rolling support means is selectable frictionally engage the continuous contact surface and cause the rotation of the hub portion in an opposite sense.

5. A propulsion apparatus as claimed in claim 1, wherein said lever arm comprises a handle, the handle being pivotable about an axis transverse to a longitudinal axis of the lever arm, so as to provide an ergonomic hand movement for a user.

6. A propulsion apparatus as claimed in claim 5, wherein the handle comprises an arcuate housing fixedly attached to one end of the lever arm and a D-shaped grip comprising an arcuate portion slidably received within the arcuate housing and a grip portion external of the arcuate housing and interconnecting opposite ends of the arcuate portion.

7. A propulsion apparatus as claimed in claim 5, wherein said handle rotates inwardly to provide a means of selectively engaging and disengaging said drive mechanism.

8. A propulsion apparatus as claimed in claim 1, wherein said hub portion is statically attached to said wheel at discrete locations.

9. A propulsion apparatus as claimed in claim 8, wherein said hub portion is statically attached to said wheel by a plurality of attachment spokes, said attachment spokes being radially extendable from a central hub.

10. A propulsion apparatus as claimed in claim 9, wherein said attachment spokes are provided at an end remote from said central hub with a respective channel shaped member adapted to at least partially receive at least one of said rim and said structural member.

11. A propulsion apparatus as claimed in claim 10 wherein said channel shaped members include a deformable insert adapted to conform under compression to the shape of at least one of said rim and said structural member.

12. A propulsion apparatus as claimed in claim 11, wherein said deformable insert is formed of a high friction material.

13. A propulsion apparatus as claimed in claim 9, wherein said attachment spokes are pivotally connected at a radially inner end to a respective intermediate member and said intermediate members are pivotally connected to a hub mounted actuating member at circumferentially spaced locations, the attachment spokes being constrained for radial motion such that rotation of the actuating member causes the attachment spokes to extend or retract depending on the sense of the rotation.

14. A propulsion apparatus as claimed in claim 13, wherein the extent of rotation of the actuating member is limited by the engagement of a projection within a slot.

15. A propulsion apparatus as claimed in claim 13, wherein in moving the attachment spokes from a retracted position to a fully extended position the location at which each intermediate member is pivotally connected to the actuating member moves circumferentially past the location at which the same intermediate member is pivotally connected to the associated attachment spoke such that the attachment spokes are retained in the fully extended position by means of an over-centering arrangement.

16. A propulsion apparatus as claimed in claim 1, wherein said lever arm is releasably connectable to said hub portion.

17. A propulsion apparatus as claimed in claim 1, wherein the drive mechanism comprises a pair of drive surfaces disposed on opposite sides of a pivot such that only one of said drive surfaces may be brought into frictional engagement with the continuous contact surface at a time.

18. A propulsion apparatus as claimed in claim 17, wherein as the lever arm is pivoted about said axis, the engagement of one of said pair of drive surfaces with the continuous contact surface causes the rotation of the hub portion in a first sense while the engagement of the other of said pair of drive surfaces with the continuous contact surface causes the rotation of the hub portion in the opposite sense.

19. A propulsion apparatus as claimed in claim 18, wherein one of said pair of drive surfaces is biased towards the continuous contact surface in preference to the other, the biased drive surface engaging the continuous contact surface to propel the vehicle in a forward direction upon pivotal movement of the lever arm about said axis.

20. A propulsion apparatus as claimed in claim 19, wherein the biasing of said one of said drive surfaces may be overcome by selective manipulation of a handle.

21. A propulsion apparatus as claimed in claim 20, wherein said handle is adapted so that said manipulation is by the rotation of said handle about a longitudinal axis of said lever arm.

22. A propulsion apparatus as claimed in claim 17, wherein each drive surface is associated with a respective rolling support means, the rolling support means contacting the continuous contact surface when said associated drive surface is in the proximity of the continuous contact surface, the rolling support means and associated drive surface being coupled such that the drive surface frictionally engages with the continuous contact surface when the associated rolling support means is rotated in a first direction and disengages the continuous contact surface when the associated rolling support means is rotated in an opposite direction.

23. A propulsion apparatus as claimed in claim 17 and comprising a second pair of drive surfaces disposed on opposite sides of a second pivot, the two pairs of drive surfaces being pivotally interconnected so as to form a parallelogram-type mechanism in which diagonally opposite drive surfaces move together into and out of frictional engagement with the continuous contact surface.

24. A propulsion apparatus as claimed in claim 1 wherein said lever arm comprises at least two parts, at least one of said parts being releasably connectable to said other parts.

25. A propulsion apparatus as claimed in claim 1 having a variable drive ratio of propulsion speed of the vehicle to power input by a user of said vehicle.

26. A propulsion apparatus as claimed in claim 1, wherein said lever arm is adapted to have a working length that is selectively adjustable such that as the working length of the lever arm is adjusted a drive ratio of propulsion speed of the vehicle to power input by a user of said vehicle is varied.

27. A propulsion apparatus as claimed in claim 26, wherein at least a part of said lever arm is adapted to collapse telescopically.

28. A propulsion apparatus as claimed in claim 1, wherein said lever arm is collapsible from an in use configuration to a stored configuration such that when collapsed said lever arm has a radial extent less than the radius of said wheel.

29. A propulsion apparatus as claimed in claim 28, wherein said lever arm further comprises a hinge at a location spaced radially inwardly of the rim of the wheel.

30. A propulsion apparatus as claimed in claim 1, wherein said lever arm further comprises a brake, said brake comprising at least one braking surface moveable between an operable position, in which the braking surface engages the continuous contact surface to slow rotation, and an inoperable position, in which the braking surface is not so engaged; and means for selectively moving said braking surface between said operable and inoperable positions.

31. A propulsion apparatus as claimed in claim 1, wherein means for activating said brake are provided on a handle of said lever arm.

32. A propulsion apparatus as claimed in claim 31, wherein said handle is movable about the axis transverse to the longitudinal axis of the lever arm such that movement of the handle to an activating position provides the means for activating said brake.

33. A propulsion apparatus as claimed in claim 1, wherein braking means are provided on said lever arm, said lever arm being inwardly pivotable such that said braking means is brought into contact with at least one of said wheel and said structural member.

34. A vehicle having at least one ground engaging wheel and a propulsion apparatus in accordance with claim 1.

35. A vehicle as claimed in claim 34, wherein a separate propulsion apparatus is provided on opposite sides of said vehicle.

36. A vehicle as claimed in claim 35, wherein said vehicle is a wheelchair.

37. A method of propelling a vehicle, the method comprising the steps of:

a) providing a propulsion apparatus as claimed in claim 1;

b) connecting said propulsion apparatus to said wheel;

c) pivoting said second portion of the propulsion apparatus such that said first portion of the propulsion apparatus is rotated, thereby rotating the wheel.

* * * * *